(12) United States Patent
Marchok et al.

(10) Patent No.: US 7,898,935 B2
(45) Date of Patent: Mar. 1, 2011

(54) OFDM/DMT/DIGITAL COMMUNICATIONS SYSTEM INCLUDING PARTIAL SEQUENCE SYMBOL PROCESSING

(75) Inventors: Daniel J. Marchok, Buchanan, MI (US);
Richard C. Younce, Wakarush, IN (US);
Peter J. W. Melsa, McKinney, TX (US)

(73) Assignee: Tellabs Operations, Inc., Naperville, IL (US)

( * ) Notice: Subject to any disclaimer, the term of this patent is extended or adjusted under 35 U.S.C. 154(b) by 22 days.

(21) Appl. No.: 11/982,449

(22) Filed: Oct. 31, 2007

(65) Prior Publication Data

US 2008/0144487 A1 Jun. 19, 2008

Related U.S. Application Data

(60) Continuation of application No. 10/883,916, filed on Jul. 2, 2004, which is a continuation of application No. 09/379,676, filed on Aug. 24, 1999, now Pat. No. 6,804,192, which is a division of application No. 08/772,321, filed on Dec. 23, 1996, now Pat. No. 6,118,758, which is a continuation-in-part of application No. 08/700,779, filed on Aug. 22, 1996, now Pat. No. 5,790,514.

(51) Int. Cl.
*H04L 5/04* (2006.01)
(52) U.S. Cl. .......... 370/210; 370/490; 370/516; 375/347
(58) Field of Classification Search .......... 370/204, 370/290, 321, 322, 326, 329, 330, 337, 345, 370/347, 442, 443, 458, 459, 498, 508; 375/260, 375/240, 347
See application file for complete search history.

(56) References Cited

U.S. PATENT DOCUMENTS

| | | | |
|---|---|---|---|
| 3,795,772 A | 3/1974 | Hill et al. | |
| 4,300,229 A | 11/1981 | Hirosaki | |
| 4,399,329 A | 8/1983 | Wharton | |
| 4,425,665 A | 1/1984 | Stauffer | |
| 4,535,472 A | 8/1985 | Tomcik | |
| 4,618,996 A | 10/1986 | Rafal et al. | |
| 4,731,816 A | 3/1988 | Hughes-Hartogs | |
| 4,817,141 A | 3/1989 | Taguchi | |
| 4,951,279 A | 8/1990 | Hotta | |
| 4,980,897 A | 12/1990 | Decker et al. | |
| 5,014,306 A * | 5/1991 | Rodgers et al. | ............... 370/286 |
| 5,077,727 A | 12/1991 | Suzuki | |
| 5,103,459 A | 4/1992 | Gilhousen et al. | |
| 5,192,957 A | 3/1993 | Kennedy | |
| 5,206,886 A | 4/1993 | Bingham | |
| 5,216,670 A | 6/1993 | Ofek et al. | |
| 5,228,025 A | 7/1993 | LeFloch et al. | |
| 5,233,546 A | 8/1993 | Witte | |

(Continued)

OTHER PUBLICATIONS

Bingham, "Multicarrier Modulation for Data Transmission: An Idea Whose Time has Come," pp. 5-8, 11-14 (1990).

(Continued)

*Primary Examiner* — Ricky Ngo
*Assistant Examiner* — Phuongchau B Nguyen
(74) *Attorney, Agent, or Firm* — Hamilton, Brook, Smith & Reynolds, P.C.

(57) ABSTRACT

A method of managing a signal over a symbol period includes supplying samples of the signal at beginning and end portions of the symbol period. The method further includes suppressing the supply of samples of the signal at a middle portion of the symbol period.

17 Claims, 18 Drawing Sheets

U.S. PATENT DOCUMENTS

| | | | |
|---|---|---|---|
| 5,253,270 A | 10/1993 | Petit | |
| 5,285,474 A | 2/1994 | Chow et al. | |
| 5,323,255 A | 6/1994 | Sierens et al. | |
| 5,406,627 A | 4/1995 | Thompson et al. | |
| 5,416,767 A | 5/1995 | Koppelaar et al. | |
| 5,416,801 A | 5/1995 | Chouly et al. | |
| 5,444,697 A | 8/1995 | Leung et al. | |
| 5,471,464 A | 11/1995 | Ikeda | |
| 5,479,447 A | 12/1995 | Chow et al. | |
| 5,483,529 A | 1/1996 | Baggen et al. | |
| 5,499,271 A * | 3/1996 | Plenge et al. | 375/295 |
| 5,502,749 A | 3/1996 | Ozaki | |
| 5,524,001 A | 6/1996 | Beaudry et al. | |
| 5,530,703 A | 6/1996 | Liu et al. | |
| 5,539,777 A | 7/1996 | Grube et al. | |
| 5,548,819 A | 8/1996 | Robb | |
| 5,553,064 A | 9/1996 | Paff et al. | |
| 5,557,612 A | 9/1996 | Bingham | |
| 5,559,789 A | 9/1996 | Nakano et al. | |
| 5,568,483 A * | 10/1996 | Padovani et al. | 370/468 |
| 5,594,757 A * | 1/1997 | Rohani | 375/344 |
| 5,596,582 A | 1/1997 | Sato et al. | |
| 5,602,835 A | 2/1997 | Seki et al. | |
| 5,603,081 A | 2/1997 | Raith et al. | |
| 5,608,725 A | 3/1997 | Grube et al. | |
| 5,608,764 A | 3/1997 | Sugita et al. | |
| 5,610,908 A | 3/1997 | Shelswell et al. | |
| 5,621,730 A | 4/1997 | Kelley | |
| 5,625,651 A | 4/1997 | Cioffi | |
| 5,636,246 A * | 6/1997 | Tzannes et al. | 375/260 |
| 5,636,250 A | 6/1997 | Scarpa | |
| 5,675,608 A | 10/1997 | Kim et al. | |
| 5,682,376 A * | 10/1997 | Hayashino et al. | 370/206 |
| 5,687,165 A | 11/1997 | Daffara et al. | |
| 5,694,389 A | 12/1997 | Seki et al. | |
| 5,703,873 A | 12/1997 | Ojanpera et al. | |
| 5,708,662 A | 1/1998 | Takashima | |
| 5,732,068 A | 3/1998 | Takahashi et al. | |
| 5,774,450 A | 6/1998 | Haranda et al. | |
| 5,778,001 A | 7/1998 | Nakayama et al. | |
| 5,786,844 A * | 7/1998 | Rogers et al. | 348/14.12 |
| 5,790,514 A | 8/1998 | Marchok et al. | |
| 5,790,516 A | 8/1998 | Gudmundson et al. | |
| 5,790,615 A | 8/1998 | Beale et al. | |
| 5,796,820 A | 8/1998 | Sasada | |
| 5,812,523 A * | 9/1998 | Isaksson et al. | 370/208 |
| 5,812,599 A | 9/1998 | Van Kerckhove | |
| 5,815,488 A | 9/1998 | Williams et al. | |
| 5,828,710 A | 10/1998 | Beale | |
| 5,841,813 A | 11/1998 | Van Nee | |
| 5,862,007 A * | 1/1999 | Pham et al. | 375/341 |
| 5,881,047 A | 3/1999 | Bremer et al. | |
| 5,912,919 A | 6/1999 | Lomp et al. | |
| 5,912,920 A | 6/1999 | Marchok et al. | |
| 5,936,961 A | 8/1999 | Chiodini et al. | |
| 5,984,514 A * | 11/1999 | Greene et al. | 375/E7.166 |
| 5,987,063 A | 11/1999 | Rinne | |
| 5,995,568 A | 11/1999 | Molnar et al. | |
| 6,002,722 A | 12/1999 | Wu | |
| 6,028,891 A * | 2/2000 | Ribner et al. | 375/222 |
| 6,044,107 A | 3/2000 | Gatherer et al. | |
| 6,055,362 A | 4/2000 | Kesner et al. | |
| 6,088,386 A | 7/2000 | Spruyt et al. | |
| 6,091,932 A | 7/2000 | Langlais | |
| 6,122,246 A | 9/2000 | Marchok et al. | |
| 6,125,150 A | 9/2000 | Wesel et al. | |
| 6,141,317 A | 10/2000 | Marchok et al. | |
| 6,353,636 B1 | 3/2002 | Tate et al. | |
| 6,370,156 B2 | 4/2002 | Spruyt et al. | |
| 6,487,252 B1 | 11/2002 | Kleider et al. | |
| 6,654,429 B1 | 11/2003 | Li | |
| 6,950,388 B2 | 9/2005 | Marchok et al. | |
| 7,471,734 B2 * | 12/2008 | Thomas et al. | 375/295 |
| 2004/0184484 A1 | 9/2004 | Marchok et al. | |
| 2006/0034166 A1 | 2/2006 | Marchok et al. | |
| 2007/0070960 A1 | 3/2007 | Barak et al. | |

OTHER PUBLICATIONS

Whitte, "The Optus Vision: Telephony, Internet, and Video,"*Australian Communications*, 7 pages (1996).

"Cablespan 2300," Training Presentation, Tellabs, Inc., pp. 1-17 (1996).

Moose, "A Technique for Orthogonal Frequency Division Multiplexing Frequency Offset Correction," *IEEE Transactions on Communications*, vol. 42, No. 10 (1994).

Jocobsen, et al., "Synchronized DMT for Multipoint-to-point Communication on HFC Networkds," *Information Systems Laboratory, IEEE Global Communications Conference in Singaport*, pp. 1-10 (1995).

* cited by examiner

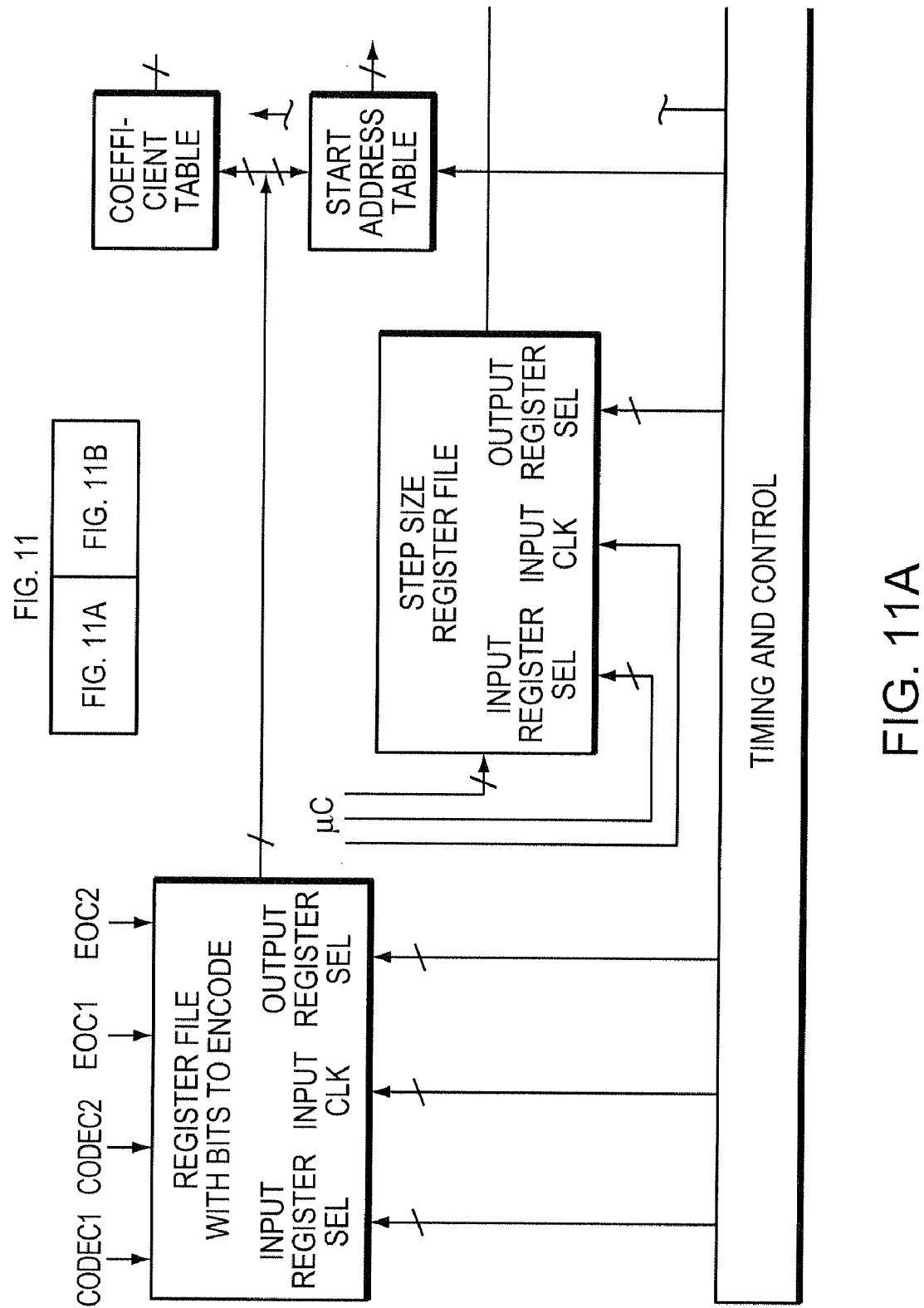

| A TAPS | 2: 0 | 1: 1099 | 1: 1098 | 1: 1097 | 1: 1096 | ... | 1: 1051 | 1: 1050 | 1: 1049 | ... | 1: 1005 | 1: 1004 | 1: 1003 | 1: 1002 | 1: 1001 | 1: 1000 |
|---|---|---|---|---|---|---|---|---|---|---|---|---|---|---|---|---|
|  | 1 | 2 | 3 | 4 | 5 |  | 50 | 51 | 52 |  | 96 | 97 | 98 | 99 | 100 | 101 |

| B TAPS | 2: 1 | 2: 0 | 1: 1099 | 1: 1098 | 1: 1097 | ... | 1: 1052 | 1: 1051 | 1: 1050 | ... | 1: 1006 | 1: 1005 | 1: 1004 | 1: 1003 | 1: 1002 | 1: 1001 |
|---|---|---|---|---|---|---|---|---|---|---|---|---|---|---|---|---|
|  | 1 | 2 | 3 | 4 | 5 |  | 50 | 51 | 52 |  | 96 | 97 | 98 | 99 | 100 | 101 |

| C TAPS | 2: 49 | 2: 48 | 2: 47 | 2: 46 | 2: 45 | ... | 2: 0 | 1: 1099 | 1: 1098 | ... | 1: 1054 | 1: 1053 | 1: 1052 | 1: 1051 | 1: 1050 | 1: 1049 |
|---|---|---|---|---|---|---|---|---|---|---|---|---|---|---|---|---|
|  | 1 | 2 | 3 | 4 | 5 |  | 50 | 51 | 52 |  | 96 | 97 | 98 | 99 | 100 | 101 |

| D TAPS | 2: 50 | 2: 49 | 2: 48 | 2: 47 | 2: 46 | ... | 2: 1 | 2: 0 | 1: 1099 | ... | 1: 1055 | 1: 1054 | 1: 1053 | 1: 1052 | 1: 1051 | 1: 1050 |
|---|---|---|---|---|---|---|---|---|---|---|---|---|---|---|---|---|
|  | 1 | 2 | 3 | 4 | 5 |  | 50 | 51 | 52 |  | 96 | 97 | 98 | 99 | 100 | 101 |

| E TAPS | 2: 99 | 2: 98 | 2: 97 | 2: 96 | 2: 95 | ... | 2: 50 | 2: 49 | 2: 48 | ... | 2: 4 | 2: 3 | 2: 2 | 2: 1 | 2: 0 | 1: 1099 |
|---|---|---|---|---|---|---|---|---|---|---|---|---|---|---|---|---|
|  | 1 | 2 | 3 | 4 | 5 |  | 50 | 51 | 52 |  | 96 | 97 | 98 | 99 | 100 | 101 |

FIG. 14

OFDM/DMT/DIGITAL COMMUNICATIONS SYSTEM INCLUDING PARTIAL SEQUENCE SYMBOL PROCESSING

RELATED APPLICATIONS

The present application is a continuation of U.S. application Ser. No. 10/883,916, filed Jul. 2, 2004, which is a continuation of U.S. application Ser. No. 09/379,676, filed on Aug. 24, 1999, now U.S. Pat. No. 6,804,192, which is a divisional of U.S. application Ser. No. 08/772,321, filed Dec. 23, 1996, now U.S. Pat. No. 6,118,758, which is a continuation-in-part application of U.S. application Ser. No. 08/700,779, filed Aug. 22, 1996, now U.S. Pat. No. 5,790,514.

STATEMENT REGARDING FEDERALLY SPONSORED RESEARCH OR DEVELOPMENT

Not Applicable.

BACKGROUND OF THE INVENTION

The present invention is directed to a remote service unit for use in an OFDM/DMT digital communications system. More particularly, the present invention is directed to an improved transmitter architecture for use in a remote service unit of a multi-point. OFDM/DMT digital communications system. Multi-point communications systems having a primary site that is coupled for communication with a plurality of secondary sites are known. One such communications system type is a cable telephony system. Cable telephony systems transmit and receive telephone call communications over the same cable transmission media as used to receive cable television signals and other cable services.

One cable telephony system currently deployed and in commercial use is the Cablespan 2300 system available from Tellabs, Inc. The Cablespan 2300 system uses a head end unit that includes a primary transmitter and primary receiver disposed at a primary site. The head end unit transmits and receives telephony data to and from a plurality of remote service units that are located at respective secondary sites. This communication scheme uses TDM QPSK modulation for the data communications and can accommodate approximately thirty phone calls within the 1.9 MHz bandwidth typically allocated for such communications.

As the number of cable telephony subscribers increases over time, the increased use will strain the limited bandwidth allocated to the cable telephony system. Generally stated, there are two potential solutions to this bandwidth allocation problem that may be used separately or in conjunction with one another. First, the bandwidth allocated to cable telephony communications may be increased. Second, the available bandwidth may be used more efficiently. It is often impractical to increase the bandwidth allocated to the cable telephony system given the competition between services for the total bandwidth assigned to the cable service provider. Therefore, it is preferable to use the allocated bandwidth in a more efficient manner. One way in which the allocated bandwidth may be used more efficiently is to use a modulation scheme that is capable of transmitting more information within a given bandwidth than the TDM QPSK modulation scheme presently employed.

The present inventors have recognized that OFDM/DMT modulation schemes may provide such an increase in transmitted information for a given bandwidth. U.S. Pat. No. 5,539,777, issued Jul. 23, 1996, purports to disclose a DMT modulation scheme for use in a communications system. The system principally focuses on applications in which a single secondary site includes a plurality of differing receiver and transmitter devices. The transmitters and receivers used at the secondary site of the system described therein, however, are quite complex and require a substantial amount of processing power. As such, the system disclosed in the '777 patent does not readily or economically lend itself to multi-point communications systems in which there are a large number of secondary sites each having at least one receiver.

BRIEF SUMMARY OF THE INVENTION

A method of managing a signal over a symbol period includes supplying samples of the signal at beginning and end portions of the symbol period. The method further includes suppressing the supply of samples of the signal at a middle portion of the symbol period.

An apparatus for managing a signal over a symbol period includes a bypass control that supplies samples of the signal at beginning and end portions of the symbol period. The bypass control suppresses the supply of samples of the signal at a middle portion of the symbol period.

A computer-readable medium includes a set of instructions for execution by a processor. The instructions are for managing a signal over a symbol period and include supplying samples of the signal at beginning and end portions of the symbol period. The instructions further include suppressing the supply of samples of the signal at a middle portion of the symbol period.

BRIEF DESCRIPTION OF THE SEVERAL VIEWS OF THE DRAWINGS

FIGS. 12-15 illustrate various aspects of one embodiment of a partial sequence filter that may be used in either the head end unit or the remote service unit.

DETAILED DESCRIPTION OF THE INVENTION

Figure 1:
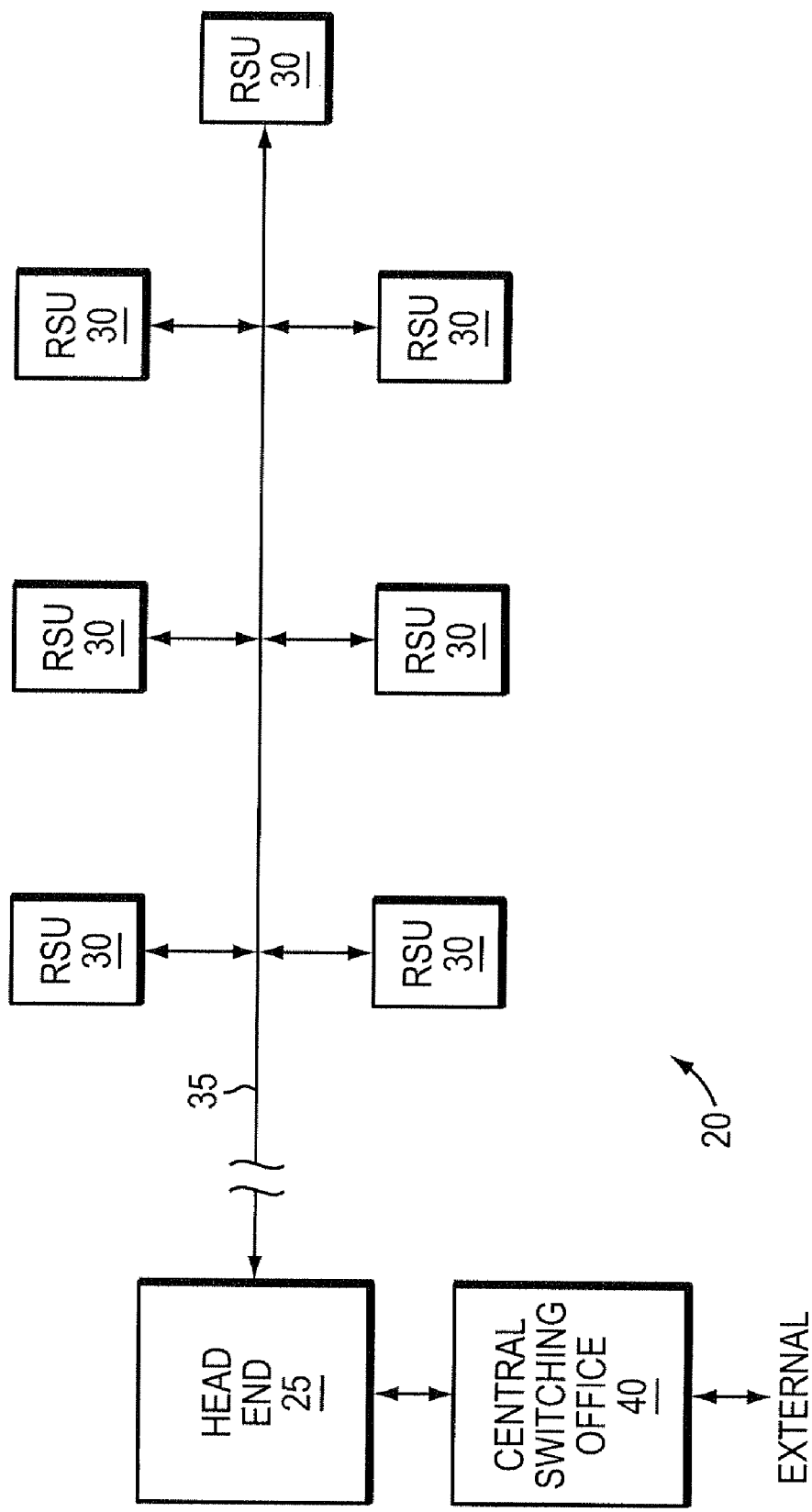
FIG. 1 is a schematic block diagram of a multi-point communications system having a plurality of remote service units disposed at a plurality of secondary sites wherein each of the remote service units comprises a receiver having an improved receiver architecture.

FIG. 1 is a block diagram of a multi-point communications system which may use a remote service unit having the improved receiver and transmitter architectures disclosed herein. As illustrated, the communications system, shown generally at 20 includes a head end unit (HE) 25 disposed at a primary site. The head end unit communicates with a plurality of remote service units (RSUs) 30 respectively disposed at a plurality of secondary sites, over a transmission medium 35 such as a coaxial cable.

The digital communications system 20 may, for example, be a cable telephony system. In such an application, the head end unit 25 is disposed at a cable television transmission facility while the remote service units 30 are disposed at individual customer locations, such as individual customer homes. The transmission medium 35 would be the new or existing transmission cable used to transmit the cable television services. The head end unit 25 in a cable telephony network is responsible for communicating with and interconnecting telephone calls between the plurality of remote service units 30 as well communicating with a central switching office 40 for sending and receiving telephone calls from sites exterior to the local cable television service area.

Figure 2:
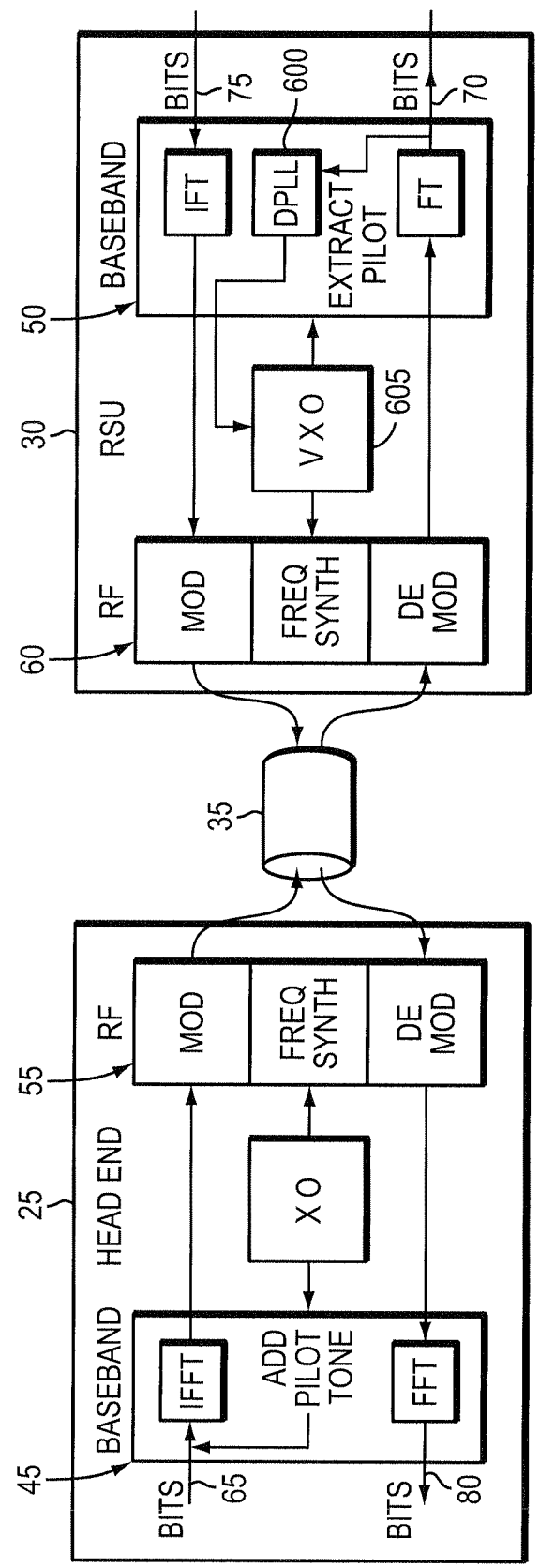
FIG. 2 is a block diagram of illustrative embodiments of the head end unit and a remote service unit of the communications system of FIG. 1.

A block diagram of one embodiment of a head end unit 25 and a remote service unit 30 is shown in FIG. 2. As illustrated, the head end unit 25 and the remote service units 30 each generally comprise respective baseband sections 45, 50 and respective RF sections 55, 60. The baseband section 45 of the head end unit 25 receives constellation data at one or more lines 65 and performs an Inverse Fast Fourier Transform on the received data. The transformed signal is modulated within the RF section 55 for transmission along the cable transmission 35. The remote service units 30 receive the RF modulated data from the cable transmission medium 35 in the respective RF section. The received signal is demodulated within the RF section 60 of the remote service unit 30 and the resulting signal is supplied to the baseband section 50 which performs a Fourier Transform on the signal to recover the data transmitted by the head end unit 25. The recovered data is supplied from the baseband section 50 along one or more lines 70 for further decoding. As is apparent from the block diagram of FIG. 2, constellation data may also be received at one or more lines 75 of the baseband section 50 of the remote receiving unit 30. The received data undergoes an Inverse Fourier Transformation or, more preferably, a direct sequence transformation and the resulting signal is RF modulated for transmission along the cable transmission medium 35 for receipt by the head end unit 25. The head end unit 25 demodulates the received signal in the RF section 55 and performs a Fast Fourier Transform on the demodulated signal to recover the transmitted data and provide it on one or more lines 80 for further decoding.

Figure 3:
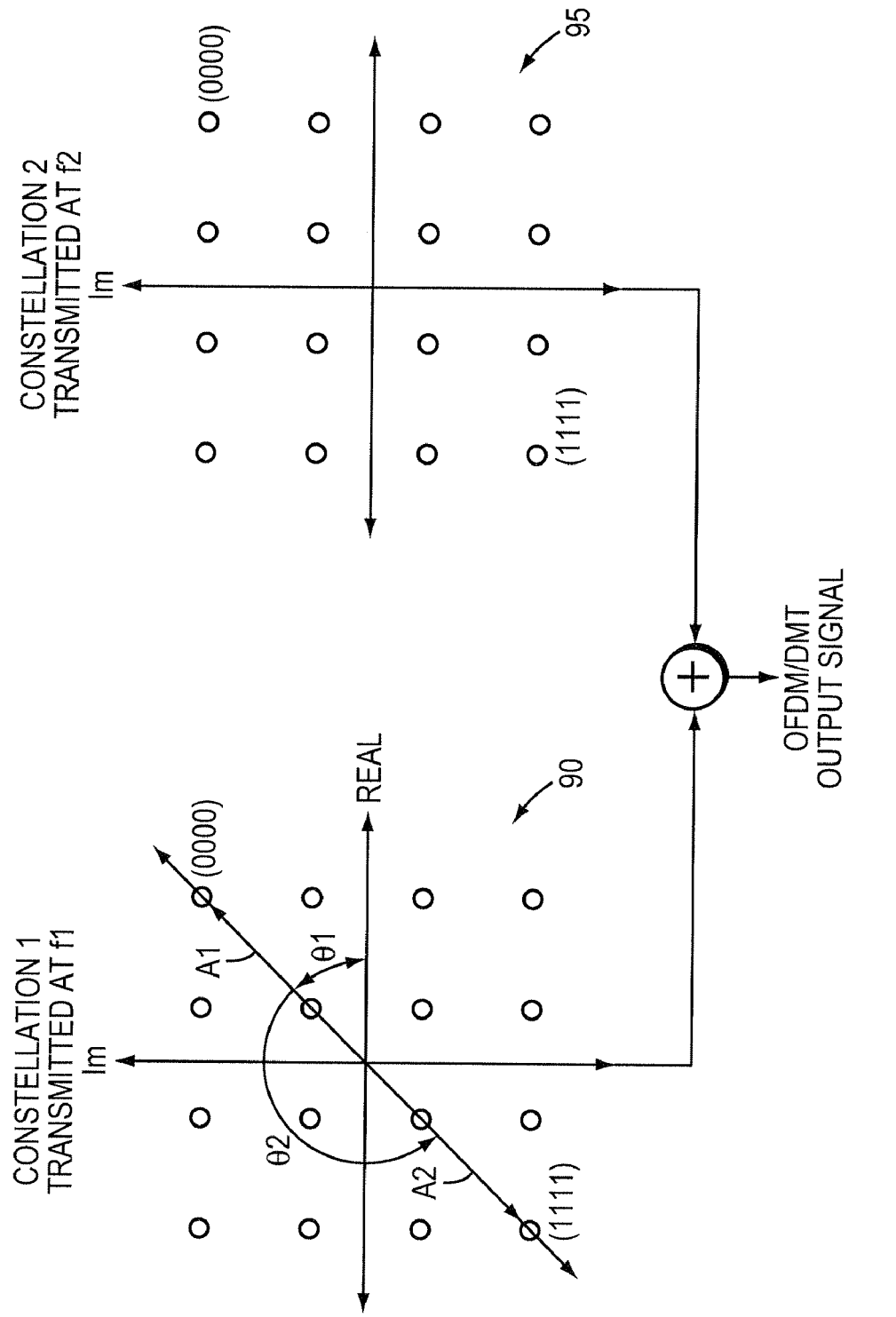
FIG. 3 illustrates two symbol constellations that are transmitted in two separate frequency bins in accordance with OFDM/DMT data modulation techniques.

The present system 20 utilizes OFDM/DMT digital data modulation for exchanging communications data between the head end unit 25 and the remote service units 30. Such OFDM/DMT digital data communications assign a particular amplitude, frequency, and phase for each transmitted "sub-symbol". The transmitted "sub-symbol" represents one or more information data bits that are to be transmitted between the units 25 and 30. Each sub-symbol may be represented by a point within a "constellation", the point being transmitted at a given carrier frequency or "bin". FIG. 3 illustrates the use of two constellations 90 and 95 each having sixteen constellation points that are capable of being transmitted within two separate frequency bins. As illustrated, a sub-symbol having a carrier signal of frequency f1 has its amplitude and phase varied depending on the constellation point that is to be transmitted. For example, a constellation point representing the binary states 0000 is transmitted as a sub-symbol at a phase of $\theta_1$ and an amplitude of $A_1$ during a designated symbol time. A constellation point representing the binary states 1111, however, is transmitted as a sub-symbol at a phase of $\theta_2$ and an amplitude of $A_2$ during a designated symbol time. Similarly, the second constellation 95, preferably having the same amplitude and phase designations for its sub-symbols as the first constellation 90, is used to modulate a second carrier frequency f2. The resulting modulated signals are combined into a single output symbol in which the individual sub-symbols are differentiated from one another based on their respective carrier frequencies or "bins". It will be recognized that many variations of the disclosed OFDM/DMT transmission scheme are possible, the foregoing scheme being merely illustrated herein to provide a basic understanding of OFDM/DMT communications.

Figure 4:
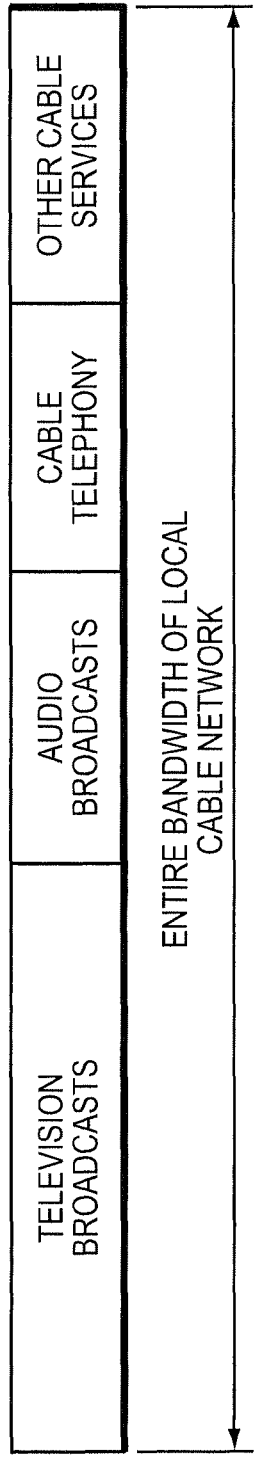
FIGS. 4 and 5 illustrate exemplary bandwidth allocations for the local cable system and the cable telephony system, respectively.

Referring to FIG. 4 there is shown an exemplary break-up of the bandwidth allocated to a local cable television service. As illustrated, the entire allocated bandwidth is further sub-allocated into smaller bandwidth portions for the transmission of selected services such as cable television, audio broadcasting, cable telephony, and other miscellaneous services. The bandwidth allocated for cable telephony constitutes the focus of further discussion. However, it will be recognized that the digital communications system described herein can be utilized in any multi-point digital data communications system.

Figure 5:
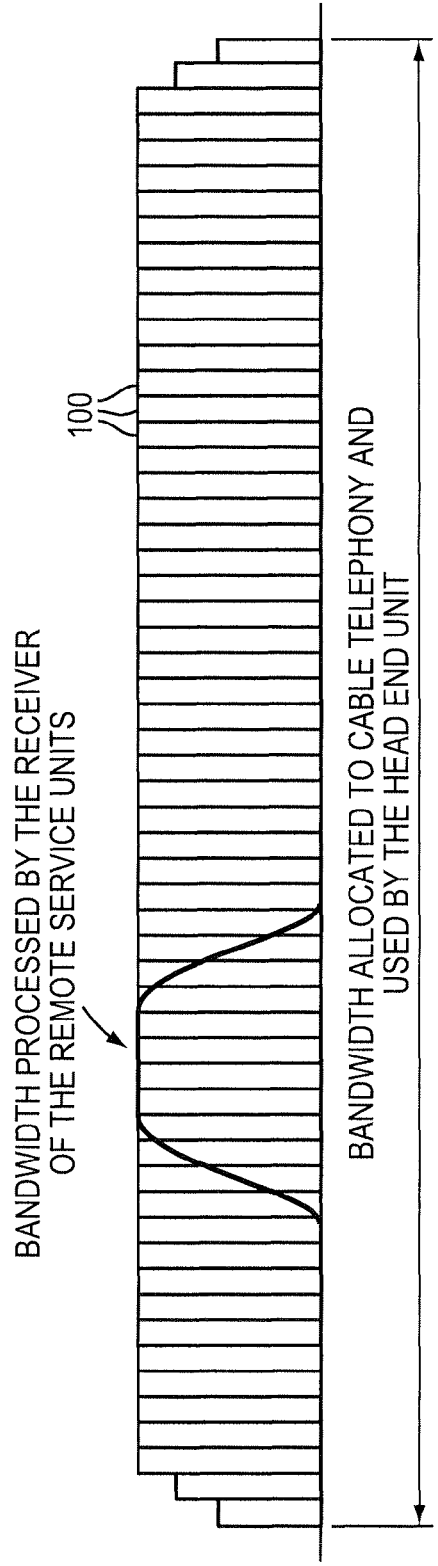

FIG. 5 illustrates the bandwidth allocated, for example, to the cable telephony communications. Without limitation, the bandwidth of the exemplary embodiment may be about 2 MHz with a center frequency of about 600 MHz. As shown, the bandwidth is divided into a plurality of bins 100, each bin carrying a sequence of sub-symbols corresponding to the data that is to be communicated. The head end unit 35 sends and receives data to and from multiple remote service units 30 and must be capable of processing substantially all, if not all of the bins allocated to cable telephony transmission. Accordingly, the head end unit 25 must have a substantial amount of processing power. Such a high amount of processing power naturally gives rise to increased production, maintenance, and power costs. Similarly, the remote service units 30 require substantial processing power if they are to each process the entire bandwidth or number of bins allocated to the cable telephony communications and transmitted by the head end unit 25.

The present inventors, however, have recognized that many applications using multi-point, OFDM/DMT data communications do not require that the remote service units 30 process the entire number of bins transmitted by the transmitter at the primary site. Rather, as recognized by the present inventors, the remote service units 30 employed in many types of OFDM/DMT data communications systems, such as cable telephony systems, need only be capable of processing a limited number of bins of the entire number of bins transmitted by the head end unit 25.

Based on this recognition, the remote service units 30 are designed to process substantially fewer bins than the entire number of bins transmitted by the head end unit 25. More particularly, the receiver architecture of each RSU is particularly adapted to exclusively digitally process only a limited number of bins of the larger number of OFDM/DMT bins that are transmitted by the head end unit 25. Remote service units 30 disposed at different secondary sites are preferably designed to process different subsets of bins. More preferably, the particular subsets of bins processed by any remote service units is dependent on command transmissions received from the head end unit 25.

Such a receiver architecture has several advantages. For example, the digital signal processing capability required by the receiver of each RSU is significantly reduced thereby making each RSU more economical to design, manufacture, and maintain. Additionally, each RSU consumes less power than would otherwise be required if each RSU had to process the complete number of bins sent by the head end unit 25.

Figure 6:
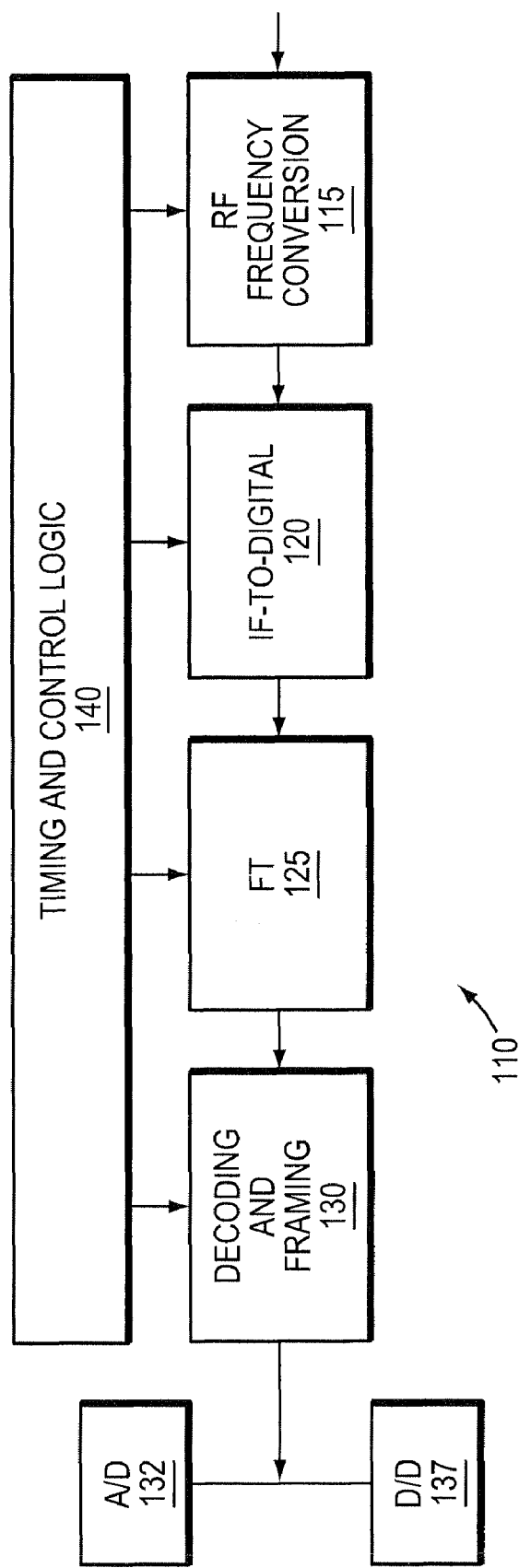
FIGS. 6-8 illustrate various embodiments of the receiver of the remote service unit at various levels of detail.

FIG. 6 is a schematic block diagram of one embodiment of a receiver 110 suitable for use in the remote service units 30. As illustrated, the exemplary embodiment is comprised of five functional sections: an RF conversion section 115, an IF-to-digital conversion section 120, a Fourier Transform section 125, a decoding and framing section 130, and a timing and control logic section 140.

The RF conversion section 115 receives the RF signal from the transmission medium 35 through, for example, a splitter, and transposes the desired part of the OFDM/DMT spectrum containing the information that is to be recovered into a predetermined intermediate frequency (IF) pass band. As will be readily recognized, and as will be set forth in further detail below, the RF conversion is achieved with a combination of mixers, filters, and frequency synthesizers.

The IF-to-digital section 120 is used to sample the IF analog signal output of the RF conversion section 115 and provide a digital output signal corresponding to fewer than all of the bins transmitted by the head end unit 25. The resulting digital output signal can thus be processed by the Fourier Transform section 125 using substantially less processing power than would otherwise be required to process the full number of bins. The desired output signal is achieved by band pass filtering the signal to provide a signal that comprises a subset of the original OFDM/DMT bins transmitted by the head end unit 25. This filtered signal is then under-sampled such that the desired signal folds down to near base band via analiasing process. Under-sampling permits the use of a lower frequency A-to-D conversion man would otherwise be required. Additionally, the under sampling reduces the number of digital samples that are generated, thereby reducing the amount of processing power required in subsequent digital processing steps in the Fourier Transform section 125.

It will be recognized, however, that under sampling is not the only choice for reducing the number of digital samples that are generated to the subsequent sections. For example, a mixer could be used to mix the filtered signal to base band thereby reducing the sampling frequency required to properly sample the received signal. This too would allow one to take advantage of the reduced bin receiver to reduce speed, complexity, and power usage of the system.

The Fourier Transform section 125 is used to take the Fourier transform of the sampled signal output from the IF-to-digital section 120 in order to obtain a frequency domain representation of the OFDM/DMT modulated signal. This can be achieved in any one of multiple ways. First, the Fourier Transform section 125 may include a digital signal processor that performs a Fourier Transform on the sampled data. However, unlike ordinary OFDM/DMT digital communications which perform a Fast Fourier Transform over all the bins sent by the transmitter at the primary site, the Fourier Transform implemented by the presently disclosed receiver 110 is taken over a reduced number of bins. This results in significant cost and power savings. A further improvement can be achieved in the case where the sampled signal received from the IF-to-digital section 120 contains more bins than any individual receiver needs to receive. In this case, a hardware correlator could be used to obtain a Fourier Transform of only the bin frequencies containing data that the receiver 110 is to recover. This permits further power and complexity reduction when the narrow band receive window is still somewhat larger than the needed bandwidth. Furthermore this architecture allows the speed and power consumption to be scaled according to the number of bins any particular receiver needs to receive.

It will be recognized that an FFT can be performed on the reduce subset of received bins yet still reap the advantages inherent in the disclosed receiver architecture. This is due to the fact that the FFT can be implemented using a digital signal processor of reduced complexity when compared to an FFT processing the entire bandwidth transmitted by the head end unit 25.

The decoding and formatting section 130 receives the processed output of the Fourier Transform section 125 and converts the received frequency domain constellation points into the corresponding data they represent thereby completing the recovery of the transmitted data. The decoding and formatting section 130 also performs any error correction, digital equalization, slicing to bits, framing, and descrambling that is required. Such decoding and formatting, as is readily recognized, is dependent on the framing and formatting used by the head end unit 25 in transmitting the data and may take on any form.

It is worth noting that phase compensation can be implemented in the decoding and formatting section 130 to compensate for any differences between the mixing frequencies of the transmitter of the head end unit 25 and the mixing frequencies of the receiver of the remote service unit 30. Such phase compensation can be implemented by effectively rotating the phase of each received sub-symbol through a predetermined phase angle $\theta_3$ during each symbol period. As such, the phase angle through which each sub-symbol is rotated is a multiple of $\theta_3$. For example, a first sub-symbol during a first symbol period T1 is rotated by phase angle $\theta_3$ while the next sub-symbol received during a subsequent second symbol period T2 is rotated by a phase angle equal to $2*\theta_3$.

The output from the decoding and formatting section 130 is supplied to the input of one or both of an analog-to-digital section 132 and direct digital section 137. The analog-to-digital section 132 converts the digital information received from the decoding and formatting section 130 to an analog signal that may be supplied to various analog devices. The direct digital section 137 provides an interface between the digital signal output of the decoding and formatting section 130 and any digital data devices.

A centralized timing and control block 140 is used in the illustrated embodiment to provide the timing and control signals required to coordinate the operation of the other processing sections. It will be recognized, however, that this timing and control function may also be performed in a decentralized way, wherein each of the individual processing sections 115, 120, 125, and 130 contain or share individual timing and control circuitry. However, in such instances, additional synchronization circuitry dealing with the resulting asynchronous nature of the clocks in the individual sections may be required. Such a decentralized architecture could also require more pipelining with its associated memory.

Figure 7:
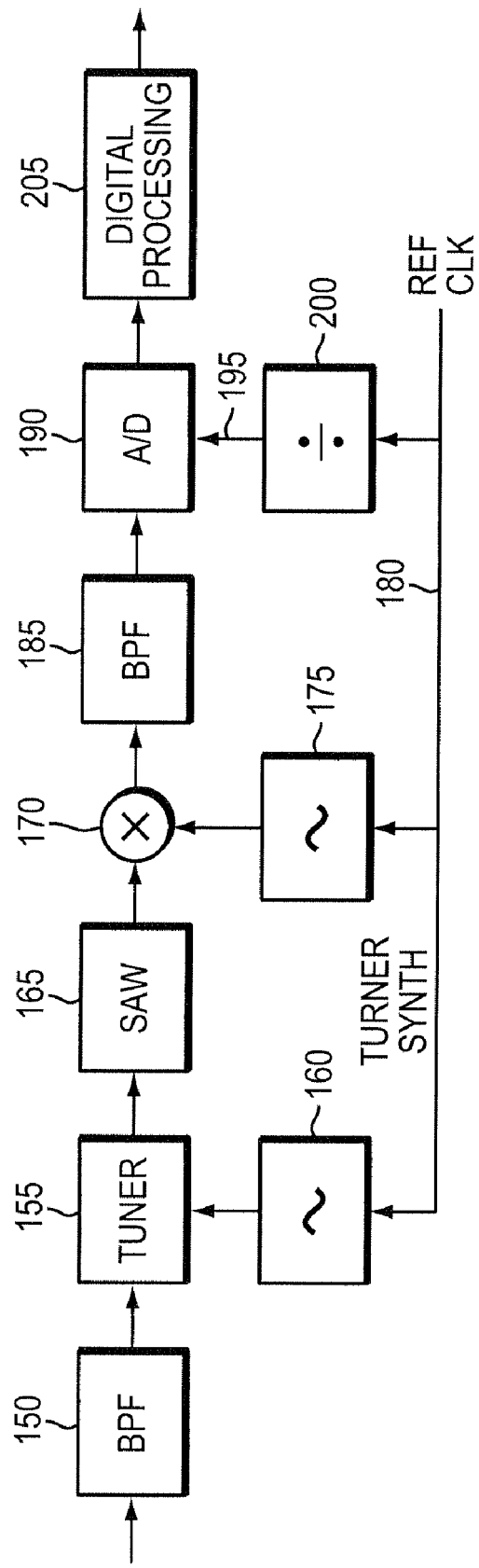

FIG. 7 illustrates one manner in which the RF section 115, the IF-to-digital section 120, and a portion of the Fourier Transform section 125 can be implemented. As shown, the signal transmitted from the head end unit 25 is received by a first bandpass filter 150 that, for example, has a wide pass band with end frequencies of about 470 MHz and 750 MHz. The signal from the bandpass filter 150 is supplied to the input of a tuner 155 that has its characteristics determined by the output of a tuner synthesizer 160 that is tied to receive the output of a reference clock that, for example, has a clock frequency of about 4 MHz. Without limitation, the tuner 155 mixes the signal from the bandpass filter 150 to a signal having a frequency of about 240 MHz. The output of the tuner 155 is supplied to the input of a further filter 165, a SAW filter in the illustrated embodiment. The output of SAW filter 165 is supplied to an IF mixer 170 that transposes the signal to an intermediate frequency (IF) of, for example, 10.7 MHz. The mixer 170 performs the IF conversion by mixing the signal received from the SAW filter 165 with the signal generated by oscillator 175. The signal generated by the oscillator 175 is synchronized to the reference clock signal received on line 180.

The received signal, now converted to the IF band, is subsequently supplied to the input of an IF bandpass filter 185 that, for example, has a 300 KHz bandwidth and a center frequency of about 10.7 MHz. The output of the bandpass filter 185 is an OFDM/DMT modulated signal having only a subset of the entire number of bins transmitted by the head end unit 25. One or both of the filters 165 and 185, however, may be used to reduce the bandwidth of the received signal so as to limit the number of bins that are ultimately processed. The filtered IF signal is converted to a digital signal by an A/D converter 190 that has its conversion clock on line 195 synchronized to the reference clock on line 180 through a clock dividing circuit 200. As noted above, the conversion clock frequency may be selected to be low enough to result in undersampling of the IF signal thereby reducing the number of samples supplied at the A/D converter 190 output. An increased in the sampling rate, however, can be used to compensate for any inexactness of filters 170 and/or 185.

The output of the A/D converter 190 is supplied to the input of a digital signal processing circuit 205 that generates the Fourier Transform of the signal that it receives, extracts the received symbols based on the Fourier Transform information, and performs any other processing functions required. In a cable telephony system, the output of the digital processing circuit 205 may be supplied to the inputs of one or more D/A converters or CODECs that convert the data contained in the received symbols to one or more analog output signals, such as audio voice signals, that can be heard by a person engaged in a telephone conversation.

Figure 8:
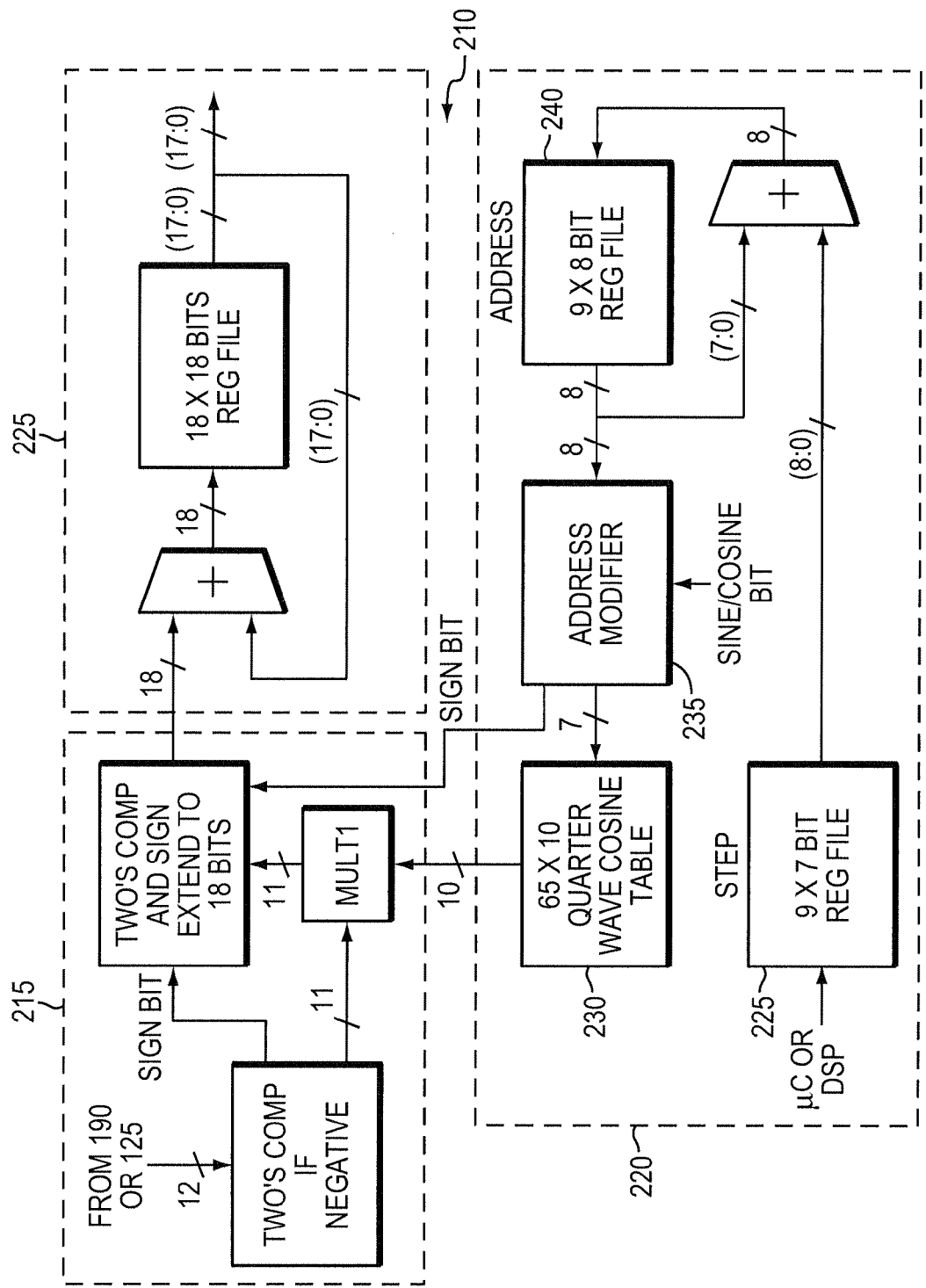

FIG. 8 illustrates one embodiment of a hardware correlator 210 that may be used in the Fourier Transform section 125. The illustrated hardware correlator 210 is designed to correlate nine frequency bins within the total bandwidth of frequency bins that are provided in digital format at the output of the A/D converter 190 of, for example, the IF-to-digital circuit 120. The correlator 210 includes a multiplier section 215, a frequency generator section 220, and an accumulator section 225. As shown, the multiplier section 215 receives the digital data that is output from the IF-to-digital section 125 and multiplies each value by the sine and cosine value of each of the nine frequency bins. The sine and cosine values are supplied as inputs to the multiplier 215 from the frequency generator section 220. The frequency generator section 220 includes a step-size register 225 that includes, in the present embodiment, nine register locations that are programmed by a microcontroller or digital signal processor. The values stored in the step-size register 225 are used to determined the step-size of the addresses supplied to address the data in a cosine table ROM 230, shown here has a quarter wave cosine table. An address modifier circuit 235 receives the address data from the address register 240 and modifies the data so that the address data supplied to the cosine table ROM 230 falls within an acceptable range of addresses and thereby accesses the proper portion of the wave. A sine/cosine bit is supplied from, for example, the timing and control circuit 140 so that each value received from the IF-to-digital converter 125 is multiplied by both the sine and cosine values of each of the nine frequency bins. The data resulting from the multiplication operation are accumulated in the accumulator section 225 and output to the decoder/formatting section 130 for further processing.

Figure 9:
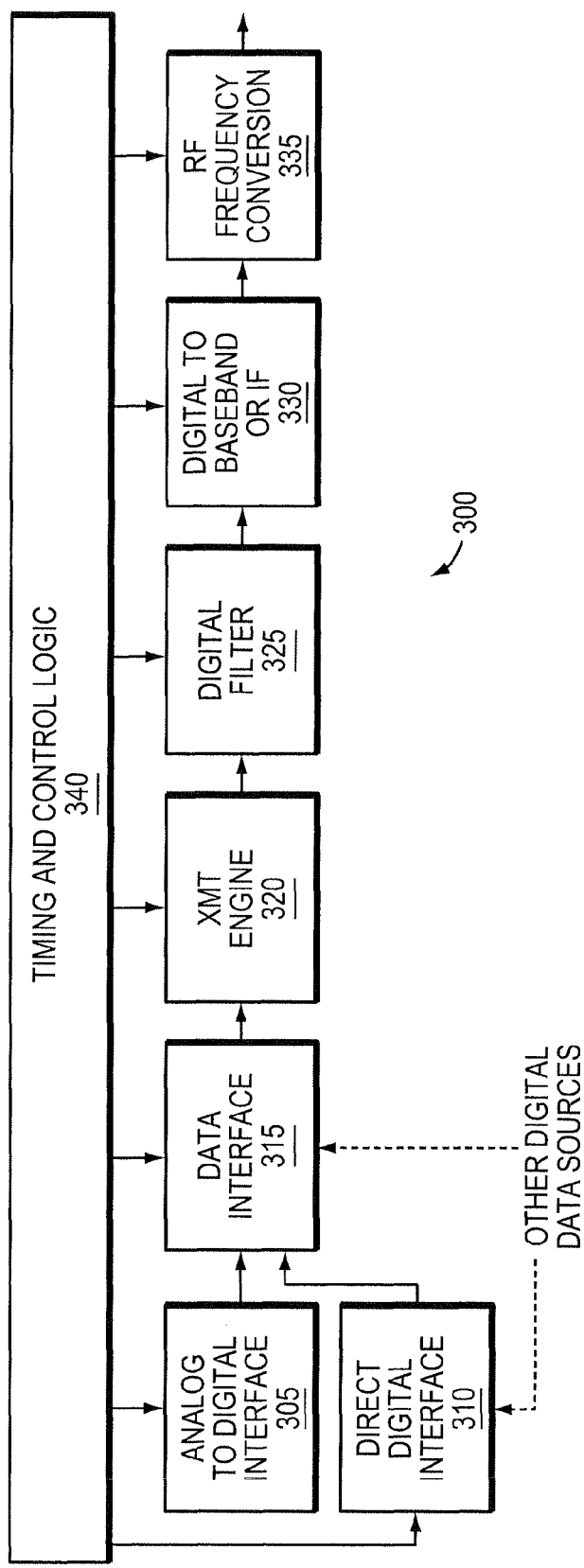
FIGS. 9-11 illustrate various embodiments of the transmitter of the remote service unit at various levels of detail.

One embodiment of a transmitter suitable for use in the remote service units 30 is illustrated in FIG. 9. The transmitter, shown generally at 300 transmits its digital data in an OFDM/DMT modulated format using a number of bins that is less than the number of bins transmitted and received by the head end unit 25. Accordingly, the transmitter 300 can generate the OFDM/DMT transmission output by modulated direct digital synthesis.

The transmitter 300 of the illustrated embodiment is designed to accept both analog and digital signal information for OFDM/DMT transmission. Accordingly, the transmitter 300 includes an analog-to-digital interface unit 305 and a direct digital interface unit 310. The analog-to-digital interface unit 305 is used to sample an analog signal, such as a voice signal of a person engaged in a telephone conversation, and convert it to digital data to be transmitted. For example, the analog-to-digital interface unit 305 may contain CODECs and SLICs for connecting one or more telephones to the system.

The direct digital interface unit 310 interfaces with any type of device that provides a signal that is already in digital format. For example, the direct digital interface unit 310 might have a serial interface for receiving data, as in a modem application. The unit 310 might also receive data from a system CPU to be sent to the receiver of the head end unit 25.

The transmitter 300 also includes a data interface unit 315. The data interface unit 315 receives data from any combination of the following: sampled analog data from the output of the analog-digital interface unit 305, direct digital data from the output of the direct digital interface unit 310, or other digital data sources that, for example, provide system communication information generated from within or without the data interface unit 315. The data interface unit 315 formats the data received from these data sources into a single data stream. Tasks such as data framing, scrambling, error correction coding, CRC generation, data synchronization, and stuffing may be performed by the data interface unit 315 as part of the formatting function. Optionally, the data interface unit 315 may group the data into words that represent the unique constellation points to be transmitted. As will be readily recognized, the specific formatting operations executed by the data interface unit 315 are dependent on the particular requirements of the communications system in which the remote service unit 30 is employed.

The serial data stream output from the data interface unit 315 is supplied to the input of the transmit engine circuit 320. The data that the transmit engine circuit 320 receives includes one constellation point for each OFDM/DMT bin of the reduced set of bins that is active during a single symbol time. The transmit engine circuit 320 is responsible for calculating the Inverse Fourier Transform on the data stream that is to be modulated and for producing a time domain sequence for each symbol along with any cyclic prefix. Generally, systems using OFDM/DMT modulation performs this function using an IFFT that is implemented, for example, with a digital signal processor. However in a multi-point application, such as the communication system disclosed herein, only a limited number of the possible frequencies or bins are used by each secondary transmitter. Given that only a portion of the total available transmission bandwidth is utilized, the disclosed secondary transmitter architecture is more efficient and cost-effective.

In the preferred embodiment of the transmit engine circuit 320, the time domain sequence is generated by modulated direct digital synthesis, sample by sample. In addition to reducing the complexity of the transmitter, this operation reduces system latency. The time domain sequence for a given symbol is created by generating sine waves, sample by sample, and adding them together. The frequency determines the bin in which the data will be received. The phase and amplitude are used to convey the data intelligence.

Additionally, the preferred embodiment of the system is such that there are 256 bins between 0 Hz and the Nyquist frequency. This is typical in OFDM/DMT systems. That is, the spectrum between 0 Hz and the Nyquist frequency is divided into a number of bins wherein the number is a power of 2, i.e. $2^n$ where n is an integer. This facilitates the use of FFTs and IFFTs. However, the presently disclosed transmitter 300 preferably uses a Nyquist frequency that is greater than the transmit bandwidth, thereby leaving a number of bins turned off on each edge. Such a transmission scheme provides a natural filtering effect at the edges of the bandwidth. In the preferred embodiment, 209 bins fit within the allocated transmit bandwidth. An additional eight bins are turned off on either end of that bandwidth to leave some transition bandwidth for filters.

Optionally, the transmitter 300 may utilize a digital filter 325 that receives the output of the transmit engine circuit 320. This optional filter performs any desired digital filtering of the output stream and, for example, may be useful in further limiting the bandwidth of the signal. The filter 325 may be, for example, a digital partial sequence filter with reduced complexity. Such a digital partial sequence filter is set forth below.

The digital sequence output from either the digital filter 325: the transmit engine circuit 320 is supplied to the input of a digital-to-baseband converter or a digital-to-IF converter 330 depending on whether the signal output is at an IF or at baseband. The converter 330 includes components that perform digital-to-analog conversion and analog filtering. If the output is at an IF, a bandpass filter centered around any image of the output spectrum may be employed. This results in an IF signal that is more easily processed in subsequent operations.

The output of the converter 330 is supplied to the input of an RF frequency converter 335. The RF frequency converter 335 shifts the OFDM/DMT spectrum from IF or baseband to the desired RF frequency. As will be readily recognized, the RF frequency converter 335 may be implemented using a combination of mixers, filters, and frequency synthesizers to implement the conversion functions and provides an OFDM/DMT output that is suitable for transmission along the transmission medium.

Timing and control of the transmitter system 300 is provided by a common timing and control logic circuit 340. A centralized timing and control circuit 340 is used in the illustrated embodiment. This function, however, could also be performed in a decentralized way. If decentralized timing and control are utilized, the timing and control circuits would likely be more complex to deal with the resulting lack of synchronism between circuits. It could also require more pipelining with its associated memory.

Figure 10:
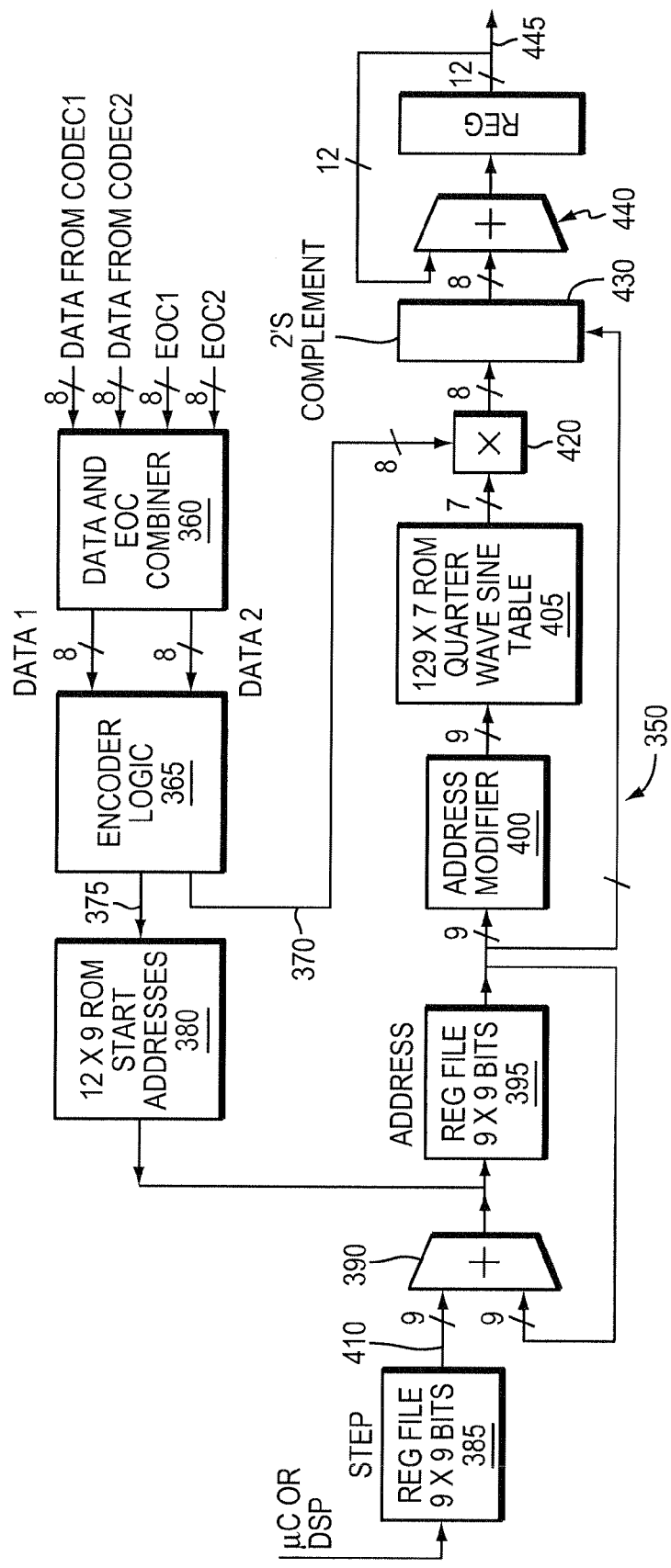

One embodiment of digital transmission circuitry that may be used to generate the digital OFDM/DMT signal for subsequent D/A conversion and RF modulation is set forth in FIG. 10. The digital transmission circuitry 350 illustrated here may be used to implement, inter alia, the transmit engine circuit 320 of FIG. 9. The digital transmission circuitry 350 accepts digital data from, for example, the output of first and second CODECs respectively associated with individual first and second telephones. Additionally, the circuitry 350 may receive digital data that is to be transmitted in embedded control channels within the transmitted signal, each of the embedded control channels being respectively associated with one of the first and second telephones. The digital data output from the CODECs and on the embedded control channels are combined together by a combiner circuit 360 into two separate data groups, illustrated here as DATA1 and DATA2. The presently disclosed embodiment provides the capability of generating OFDM/DMT transmissions in one or more of nine frequency bins.

Each data group DATA1 and DATA2 is supplied to the input of an encoder logic circuit 365. The encoder logic circuit 365 divides the data groups into symbol groups and maps each symbol to a point of a constellation to obtain a phase and amplitude for each symbol. The amplitude information for each symbol is provided on one or more lines 370, while the phase information for each symbol is provided on one or more lines 375.

Generation of the desired frequency and phase for each symbol takes place through the interrelated operation of the start address selection ROM 380, the step size selection register 385, adder 390, address register 395, address modifier 400, and sine table ROM 405. The sine table ROM 405 contains the digital data representation of a sine wave, or selected portion thereof, shown here as a quarter wave table, in successive addressable memory locations. The successive, addressable memory locations of the sine table ROM 405 are addressed in a specific manner to provide a digital output signal having the phase and frequency characteristics of the symbol that it is to represent. The phase of the sine wave represented by the digital output signal is dependent on the memory location that is first addressed at the beginning of the symbol period while the frequency of the sine wave is determined by the step size used to address successive memory locations within the sine table ROM.

The selection of the memory location that is first addressed at the beginning of a symbol period is dependent on the phase information on output lines 375 of the encoder logic circuit 365. The phase information is supplied to the start address ROM 380 which provides a start address which is output to the address storage register 395. The step size through which the memory locations within the sine table ROM 405 are to be cycled is determined by the value at the output of the step size storage register 385. The step size storage register 385 includes one or more memory storage locations that are accessible to a micro controller or DSP. The microcontroller determines the step sizes that are stored in the step size storage register 385 based on the desired symbol carrier frequency bin is that can be used—the larger the step size, the higher the carrier frequency. In the illustrated embodiment, the step size register 385 includes nine register locations for the nine bins that can be transmitted. Preferably, the step size register 385 is programmed by the microcontroller based on commands received from the head end unit 25. The step size value is supplied at one or more output lines 410 of the step size register 385 to the input of the adder 390. The adder 390 functions to provide the address signals that are used to successively address the memory locations of the sine table ROM 405. Accordingly, the output of the address register 395 is fed back to the input of the adder 390 so that the sine table ROM 405 selection address is incremented by the appropriate step size on each successive addressing cycle corresponding to the particular frequency bins.

Since the sine table ROM 405 of the present embodiment only contains a portion of a single sine wave, an address modifier 400 is used. The address modifier 400 includes combinatorial and/or programmed logic circuits that perform calculations that ensure that the address value supplied to the sine table ROM 405 falls within an acceptable range and thereby accesses the appropriate portion of the wave. Such calculations ensure that the newly calculated address starts at the appropriate portion of the sine table ROM 405 without generating an undesired discontinuity.

The output of the sine table ROM 405 is supplied to the input of a multiplier 420. The multiplier 420 accepts each digital data value that is output from the sine table ROM 405 and multiplies each value by the corresponding amplitude factor as determined from the amplitude information output of the encoder logic circuit 365 received along lines 370.

Since the sine table ROM 405 of the presently disclosed embodiment includes only positive values, some circuitry must be provided to generate the negative portions of the wave. To this end, the output of the multiplier 420 is supplied to a two's complement converter 430 and the most significant bit (MSB) from the address register 395 is used to signal the converter 430 to either through-connect the output of the multiplier 420 to an accumulator 440 or perform a two's complement operation on the output before providing it to the accumulator 440. The accumulator 440 adds all of the data points for the nine frequency bins that are generated during a single sample period and provides the resulting data on output lines 445.

As will be readily recognized, the timing and control inputs from the timing and control logic circuitry 340 are not illustrated in FIG. 10. Such inputs have been omitted in order to simplify the figure. Given the foregoing description, the timing and control operations can be readily derived.

Figure 11B:
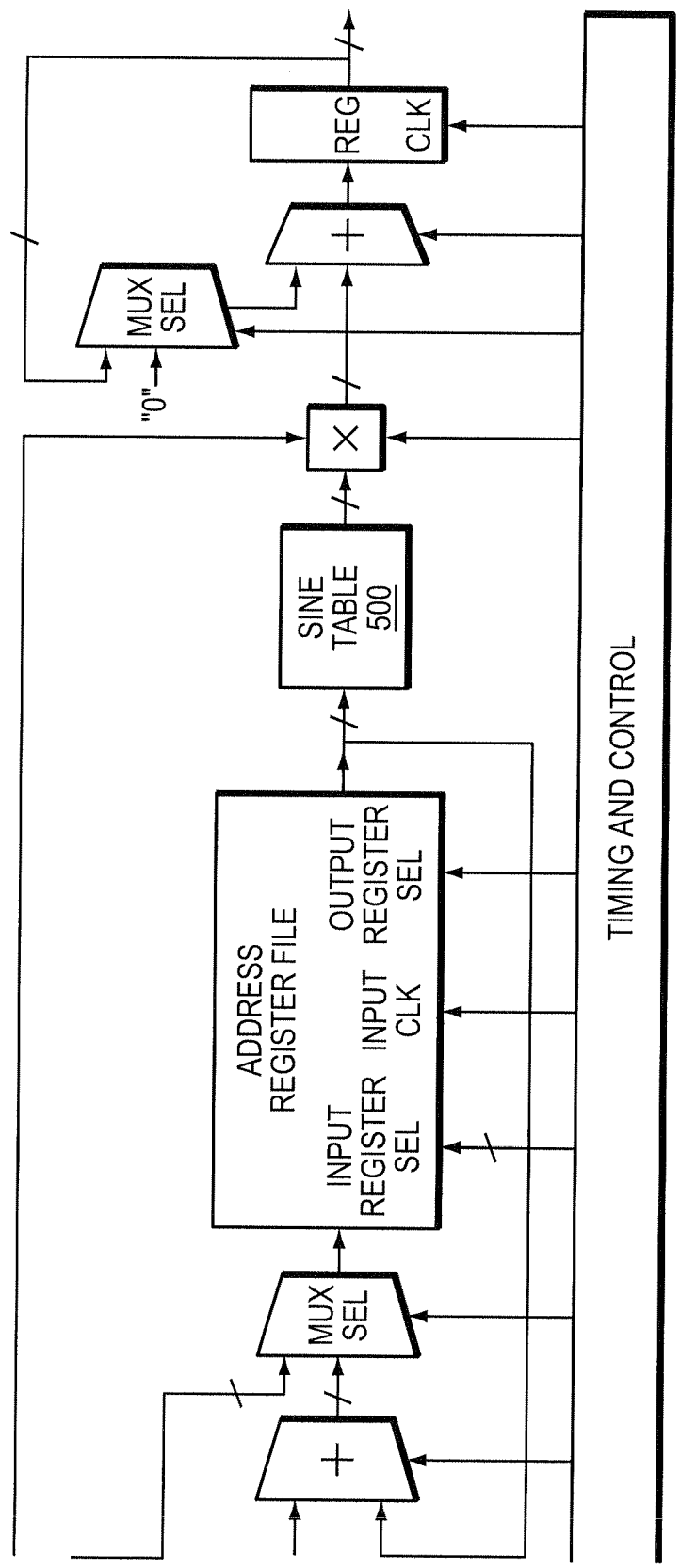

FIG. 11 shows yet a further embodiment of the basic elements of the transmit engine shown in FIG. 9. In the embodiment of FIG. 11, a full wave sine table ROM 500 is utilized. Accordingly, the two's complement circuit 430 and the address modifier 400 are not provided.

Figure 12:
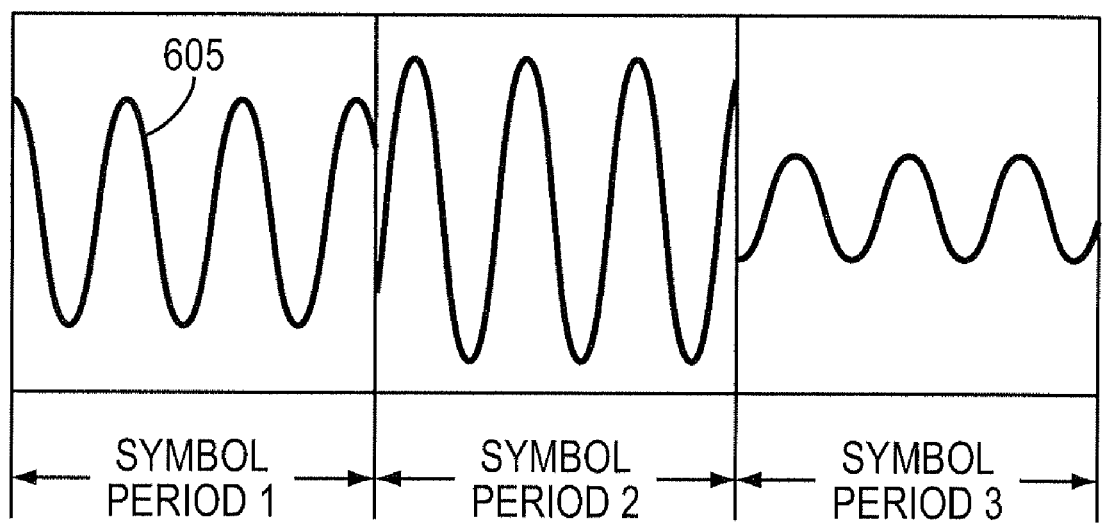

With reference to FIG. 9, the digital filter redefine may be a partial sequence filter. The basic operation of a partial sequence filter 600 can best be understood in connection with the waveforms illustrated in FIG. 12. Line 605 of FIG. 12 is a time domain signal representing one bin of an OFDM/DMT signal over three symbol periods. As shown, the beginning of each symbol signal is generally discontinuous to the preceding symbol signal and the end of each symbol signal is generally discontinuous to the beginning of the subsequent symbol signal. The discontinuities between symbols result in a generally broad-band frequency spectrum which the digital filter 325 is designed to limit.

The digital filter 325 may be implemented as a finite impulse response (FIR) filter. Typically, a FIR filter is expected to process all of the digital samples provided by the transmit engine of the preceding stage. That is, all of the digital samples that are output from the transmit engine 320 are supplied to the input of and are processed by the FIR filter. Such a FIR filter thus requires a substantial amount of processing power. For example, a 101 tap FIR filter responsive to a digital signal having a 10 MHz sampling frequency would typically require approximately 1000 MIPS to perform the requisite multiplication. If the filter is symmetric, the complexity can be reduced so that 500 MIPS are required to perform this multiplication. In either instance, such a filter implementation may be quite costly, particularly in a multipoint digital communications system.

The present inventors have recognized a unique characteristic of DMT/OFDM signals and have used this characteristic to reduce the complexity of the filter. With reference to FIG. 12, the present inventors have recognized that the OFDM/DMT signal looks like a tone during a substantial portion of the middle of the symbol period. The discontinuities that broaden the frequency spectrum of the transmitted symbols occur only at the beginning portion and end portion of the symbol period. In view of this characteristic, the inventors have recognized that, when the taps of a FIR filter are inside of a single symbol, the filter's output is approximately the same as the input. This relationship exists when the FIR filter has unity gain and exhibits linear phase in the pass band. As such, a FIR filter does not alter signals within the pass band and need only perform filtering of samples taken at the beginning portion and end portion of a symbol period.

In view of the foregoing characteristics, the inventors have recognized that the filter 325 may be a partial sequence filter that digitally filters only a select portion of the samples of a symbol period, in an OFDM/DMT system, such as the one disclosed herein, the partial sequence filter digitally filters only the samples occurring at a beginning portion of the sample period and an end portion of the sample period. For example, if a 101 tap FIR filter is used in the disclosed system, it becomes possible to only digitally process 100 of the 1100 samples in every symbol period, 50 samples at the beginning portion of a symbol period and 50 samples at the end portion of a symbol period. Such an approach reduces the number of multiplies that must be executed by a factor of 100/1100, resulting in only approximately 9% of the complexity that would otherwise be required if all 1100 samples were processed. The result is a reduction from 1000 MIPS to 91 MIPS. The complexity may be further reduced using standard filtering techniques that can be used for FIR filters with symmetric taps. Since sample 1 is multiplied by the same coefficient as used with sample 101, sample 1 may be added to sample 101 before multiplication. Likewise, sample 2 is multiplied by the same coefficient as sample 100 and, as such, sample 2 may be added to sample 100 before multiplication. This symmetrical relationship can be used for approximately all of the processed samples. Application of this principle further reduces the complexity to 45 MIPS.

The partial sequence filtering can be implemented by dedicated hardware or with a digital signal processor. For example, a digital signal processor within the head end unit 25 may be used to implement the partial sequence filter. Alternatively, a dedicated hardware circuit, such as the one illustrated in FIG. 13, may be used to implement the partial sequence filter.

Figure 13:
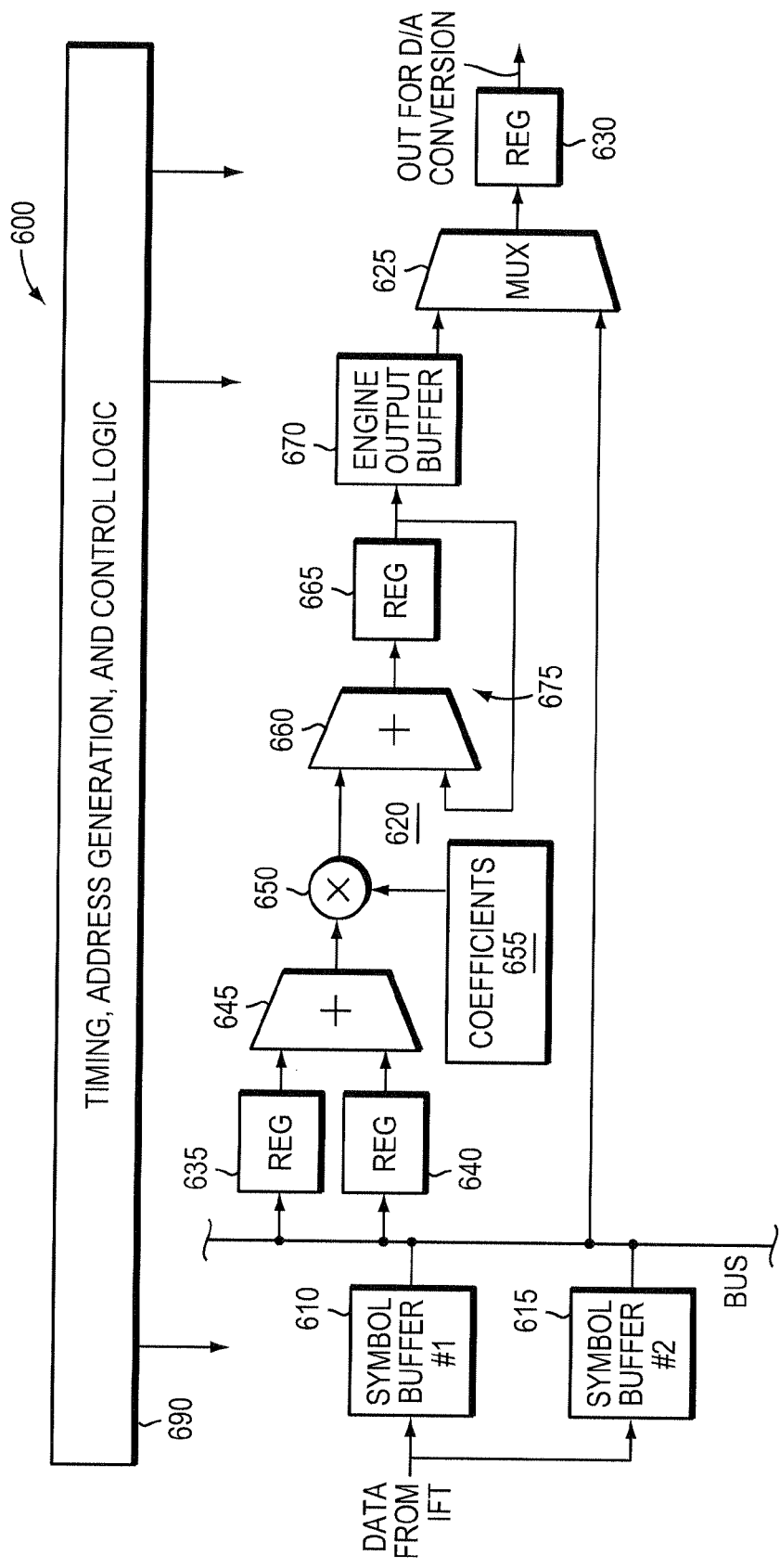

FIG. 13 illustrates an exemplary implementation of the partial sequence filter. As illustrated, the partial sequence filter, shown generally at 600, receives blocks of data from a preceding IFT process, such as the process performed by the transmit engine 320. As noted above, the IFT takes the inverse Fourier transform for a set of constellation points that make up a given symbol. A new block of samples is generated once for every symbol. After each symbol undergoes an IFT, the time domain data is written to either symbol buffer 610 or symbol buffer 615, alternately. It may be advantageous to use a cyclic prefix at the start of every symbol. Such a cyclic prefix is described below. In such instances, the end of the sequence generated by the preceding IFT process is tacked onto the beginning of the time sequence and functions as the cyclic prefix.

The partial sequence filter 600 is comprised of symbol buffers 610 and 615, a filter engine, shown generally at 620, a multiplexer 625, and an output register 630. Generally stated, after undergoing a preceding IFT process, the digital data for each symbol is alternately stored in either symbol buffer 610 or symbol buffer 615. The IFT processed symbol data for each symbol is supplied from one or the other of the symbol buffers 610, 615 to either the input of the filter engine 620 for filter processing and subsequent supply, for example, to the digital-to-baseband (or IF) circuit 330, through output register 630 or directly, without filtering, for supply to circuit 330 through output register 630. Only selected portions of the data within a given symbol buffer are supplied for filtering to the input of the filter engine 620, the remaining data being bypassed around the filter engine 620 for supply to the input of circuit 330. The bypass operation is facilitated by selection of the appropriate data through multiplexer 625.

As illustrated, the transmit engine 620 is comprised of registers 635 and 640, adder 645, digital multiplier 650, coefficient data table memory 655, adder 660, feedback register 665, and engine output buffer 670. Together, the adder 660 and feedback register 665 constitute an accumulator 675. With respect to the particular embodiment of the filter engine illustrated here, it is assumed that the filter is symmetric so that the coefficient for FIR filter tap 101 is the same as the coefficient for FIR filter tap 1. Likewise, the coefficient for tap 100 is the same as that of tap 2.

In operation, given the foregoing assumptions, the sample needed for tap 101 is first latched into register 635. The sample needed for tap 1 is then latched into register 640. The two samples are added to one another by adder 645. The resulting sum is supplied to the input of digital multiplier 650 where it is multiplied by the coefficient for tap 1 as supplied from the coefficient table memory 655. The resulting digital value is effectively stored in register 665 of the accumulator 675 (the initial value contained in register 665 is assumed to be zero). The same basic operation is next performed for the samples needed for taps 2 and 100, but using the coefficient for tap 2 as supplied from the coefficient table memory 655. The digital value resulting from the multiplication with the coefficient for tap 2, however, is added to the digital value result of the previous multiplication that is already stored in register 665 by the accumulator 675. In the exemplary embodiment, this operation is repeated for a total of 50 times. The $51^{st}$ operation proceeds in a slightly different matter. More particularly, the data corresponding to tap 51 is stored in register 635, while register 640 is loaded with a zero. These values are added to one another by adder 645 and are multiplied by tap coefficient 51 at multiplier 650. The resulting value is added to the digital value that is already present in register 665. The result is again latched into register 665. As such, resister 665 contains a filtered output value. This filtered output value is subsequently stored in the engine output buffer 670 for subsequent supply to the D/A converter of the digital-to-baseband (or IF) circuit 330 through multiplexer 62 history5 and register 630.

FIGS. 14A-E illustrate data passing through the filter engine 620 of the illustrated partial sequence filter 600 having a 101 tap FIR filter. To obtain an output sample from the filter, each tap multiplies the corresponding data and the results of these multiplication operations are summed together. In FIGS. 14A-E, the data samples are denoted as X:Y, where X represents the symbol number and Y represents the sample number for the particular symbol. For example, the notation 1:1000 represents the $1000^{th}$ sample of symbol number one. Each tap is denoted by a numbered box, and the particular data sample present at a given tap is shown therein to indicate the positions of the data samples within the filter at a given time. For example, at the time designated by the filter state represented in FIG. 14A, tap 1 is multiplying sample 2:0, tap 2 is multiplying sample 1:1099, etc.

With reference to FIG. 14A, the filter contains data from both symbol number 1 and symbol number 2. As shown, the first sample of the second symbol, 2:0, has just entered the filter engine and is multiplied by the coefficient for tap 1. All of the other taps multiply samples from the previous symbol, symbol number 1. The digital filter output, which is the sum of all of the multiplications, replaces sample 1:1050 for D/A conversion. In the specific example illustrated here, the output of the filter will always replace the data sample that is in the box corresponding to tap 51.

FIGS. 14B-E illustrate subsequent operations of the filter. More particularly, FIG. 14B illustrates the state of the filter in an operation immediately subsequent to the filter state shown in FIG. 14A. FIG. 14C illustrates the state of the filter for the last sample from symbol 1 (1:1099) that needs to be replaced. FIG. 14D shows the state of the filter for the first sample from symbol 2 (2:0) that needs to be replaced on the way to the D/A converter of the circuit 330. Finally, FIG. 14E shows the state of the filter for the last sample that needs to be replaced in the first fifty samples of symbol number 2 (2:49). The last 50 samples of symbol number 2 also require filtering and would be processed accordingly.

To function properly, the partial sequence filter should be designed to have an amplitude and phase effect in the pass band. Absent such effects, a significant discontinuity will exist between the filtered and unfiltered data. Such discontinuities may result in both in-band and out-of-band noise.

Coordination of the overall timing and control, including the reading and writing of the symbol buffers 610 and 615, control of the state of the filter engine 620, control of the multiplication and summing operations, and selection of filtered or unfiltered data for output to the D/A converter of circuit 330 are performed by the timing, address generation, and control logic circuit 690 (control logic unit). The control logic unit 690 coordinates the reading and writing of the symbol buffers 610 and 615 with receipt of data samples from the preceding IFT process to ensure that the IFT process is complete and that the samples are at least beginning to be written to one of the symbol buffers before those samples are needed at the output register 630. The control logic unit 690 should also ensure that the samples in one or the other of symbol buffers 610, 615 are supplied to either the filter engine 620 or the output register 630 before they are overwritten by the symbol data from the subsequent IFT operation. Additionally, the control logic unit 690 should coordinate movement of the data through the partial sequence filter so that data is available to the filter engine 620 at a rate which allows the filter engine to run at a moderate rate over the majority of the symbol period.

The control logic unit 690 should control the relationship between the read and write pointers associated with each of the symbol buffers 610 and 615 and the engine output buffer 670 so as to minimize latency. However, latency can be added to the system design to reduce timing constraints.

Figure 15:
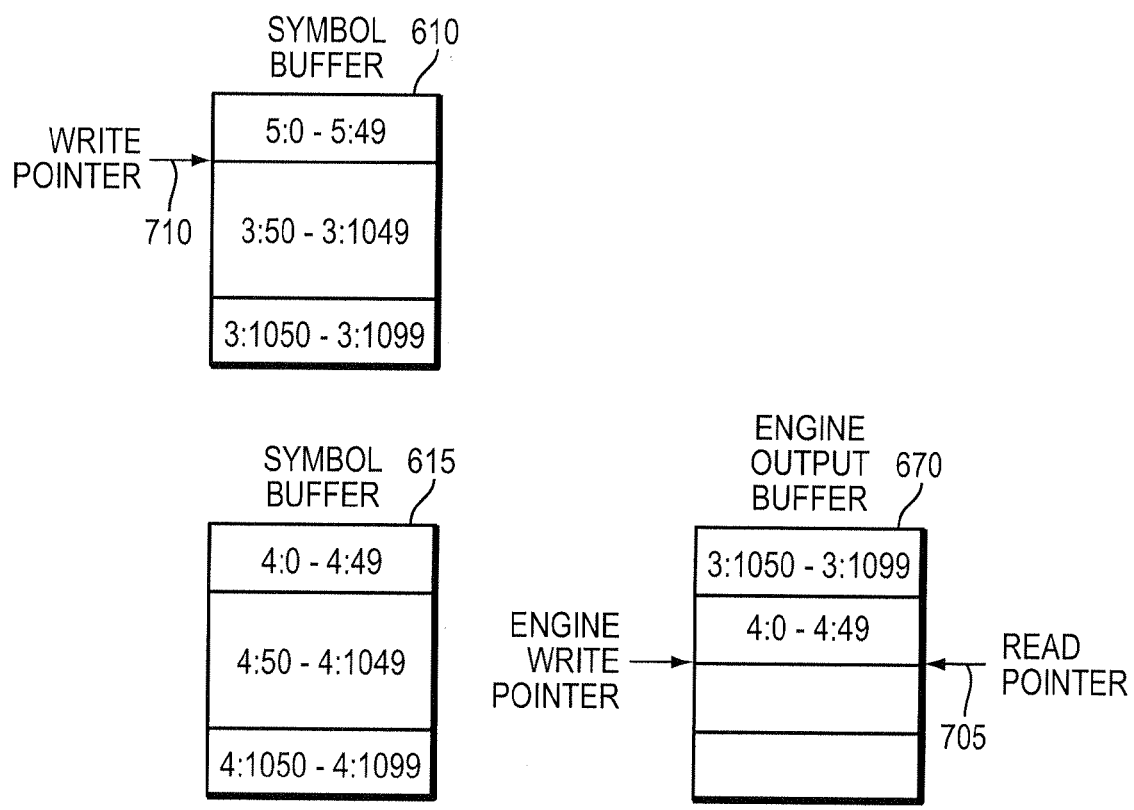

FIG. 15 illustrates the relationship between some of the buffer read and write pointers. In the illustration, the timing between the pointers is shown near the buffer boundaries. In a preferred embodiment of the partial sequence filter, the read pointer 705 that gets the data from the engine output buffer 670 for supply to the output register 630 is also used to read data from each of symbol buffers 610 and 615. The read pointer 705 gets data samples X:50-X:1049 from one or the other of symbol buffers 610 and 615 (depending on where symbol number X is stored), and gets data samples X:0-X:49 and X:1050-X:1099 from the engine output buffer 670. The appropriate samples should always be available to the output register 630 for subsequent processing. To reduce latency, however, the samples are processed as close to just-in-time as practical.

The exemplary pointer locations illustrated in FIG. 15 show the pointers near crossover points to illustrate how close the pointers can come to one another. In the exemplary illustration, the filter engine 620 has just completed the writing of the outputs that will replace sample 4:49 and has begun processing the 4:1050 replacements. The read pointer 705 is just beginning to read sample 4:49 from the engine output buffer 670. Meanwhile, the write pointer 710 has just finished writing sample 5:49 so that the filter engine has every sample required to process the 4:1050 replacement.

Figure 16:
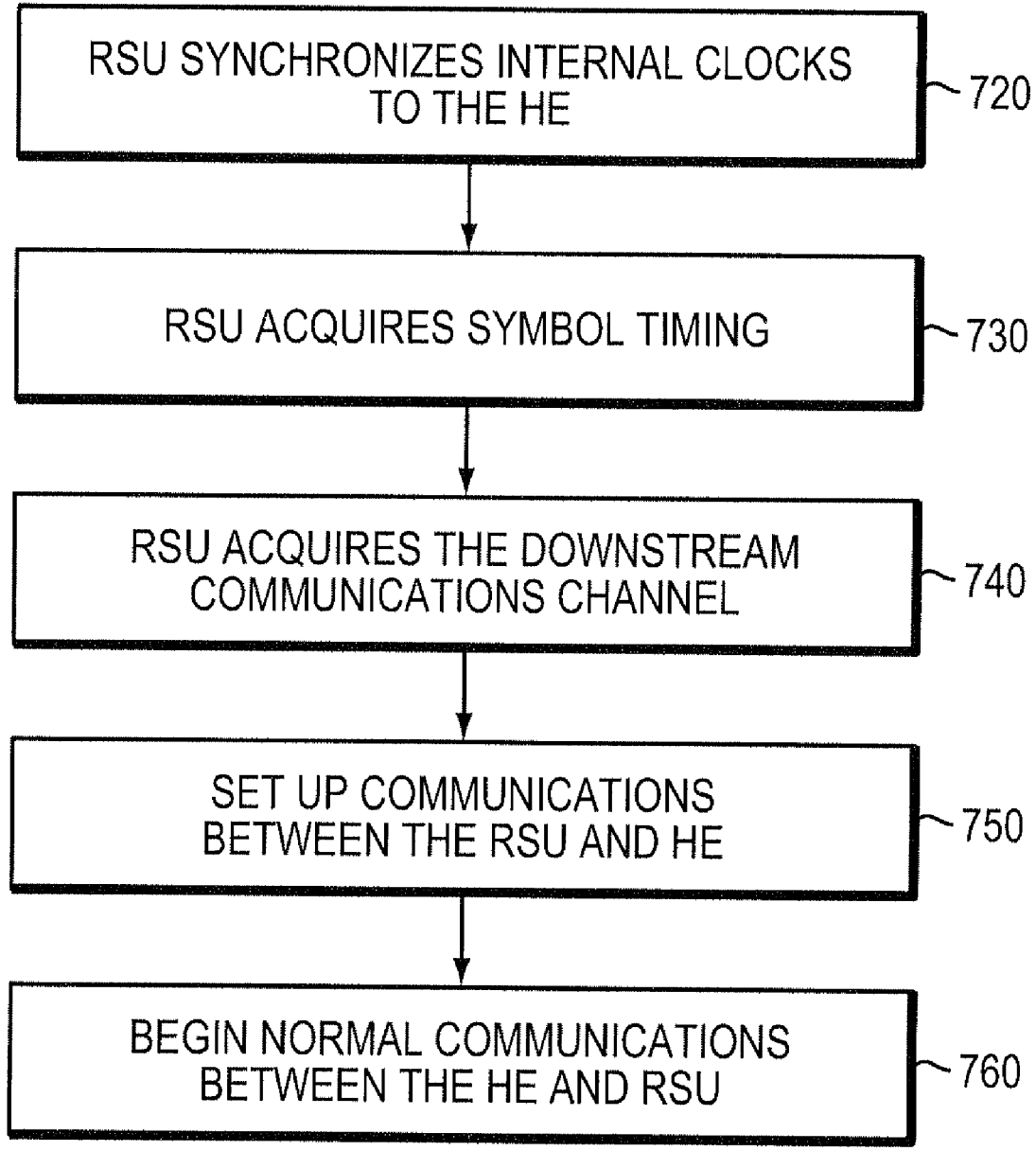
FIGS. 16-18 illustrate one way in which the head end unit and a newly added remote service unit can initialize communications.
Figure 17:
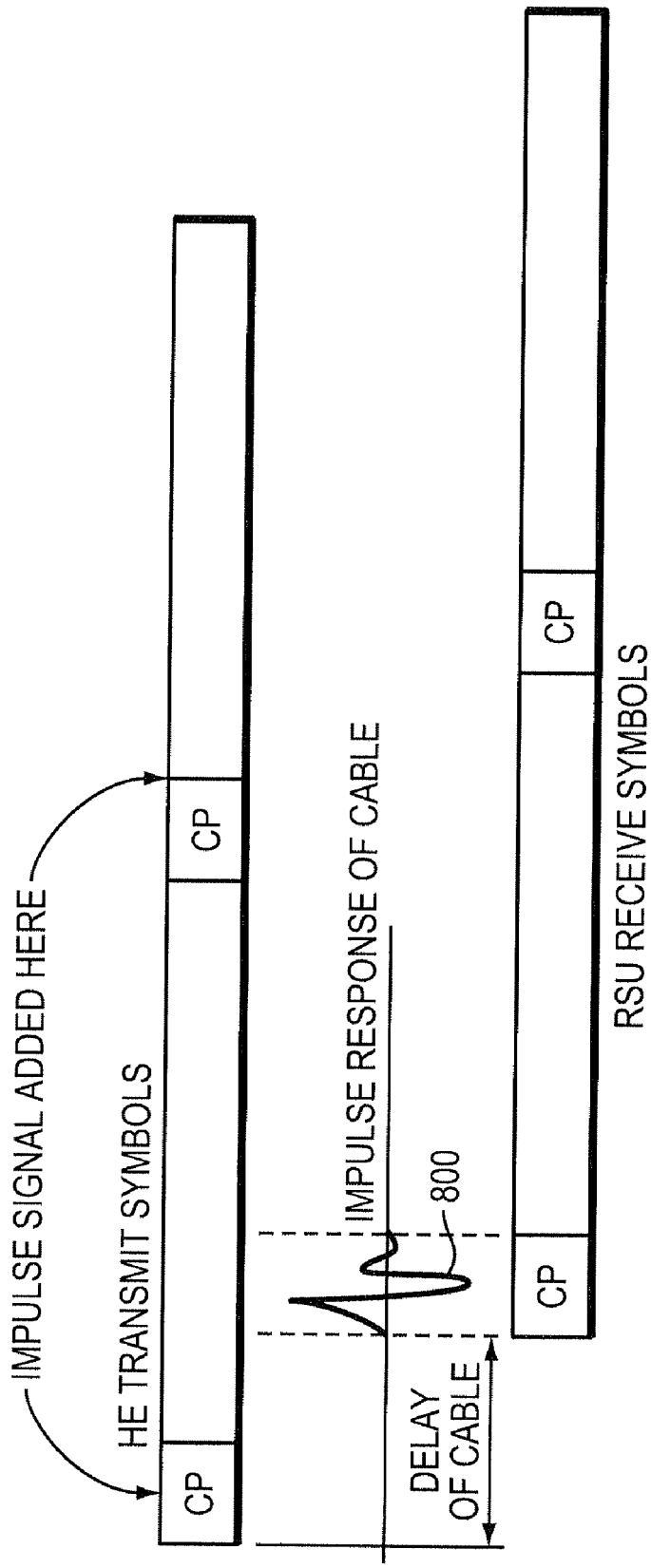
Figure 18:
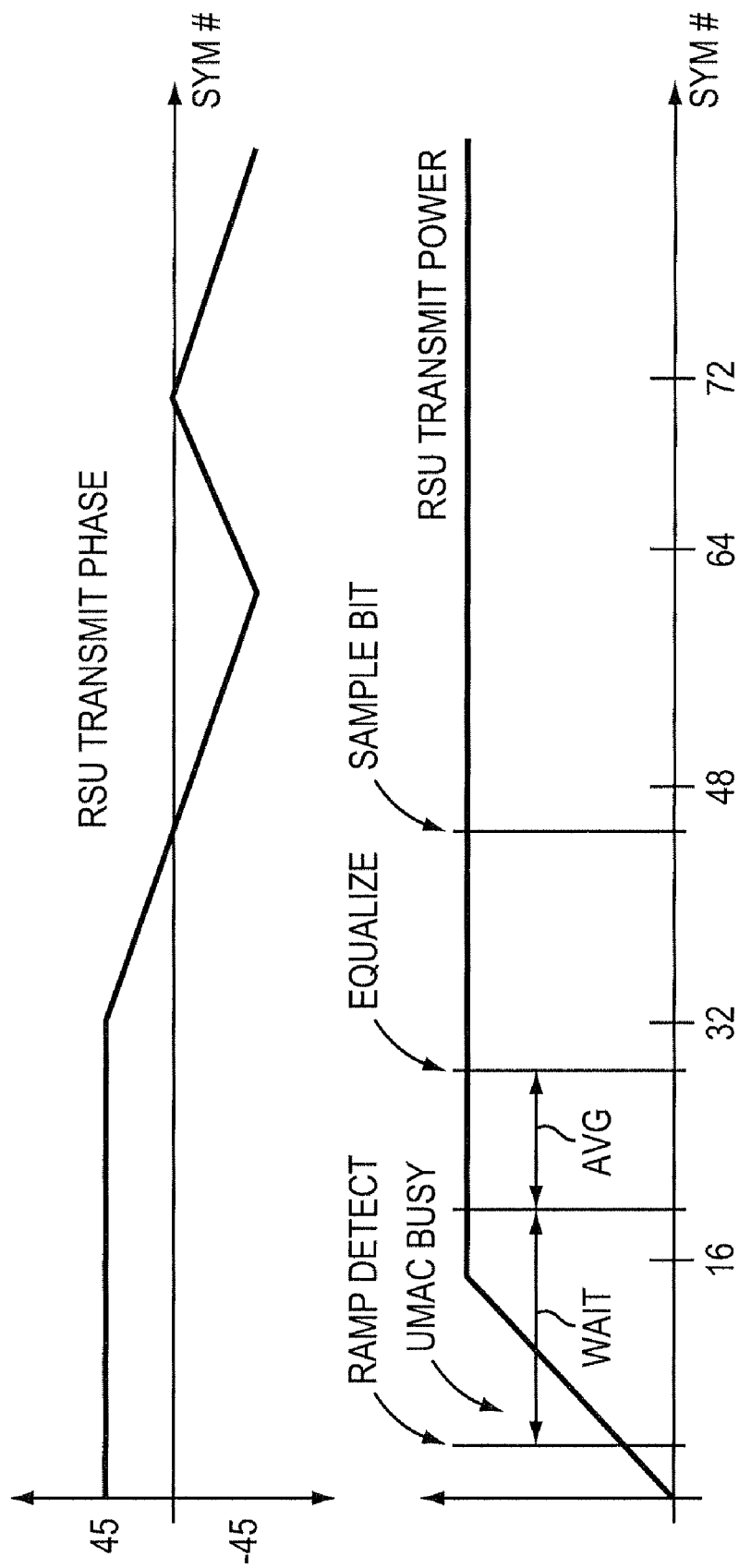

Although not particularly pertinent to the improved receiver architecture disclosed herein, FIGS. 16-18 illustrate one manner of initiating communications between a newly added or powered-up remote service unit 30 and the head end unit 25. As shown at step 720, the remote service unit 30 first synchronizes its internal clocks with the head end unit 25. One way in which this may be accomplished can be described with reference to FIG. 2 which shows a pilot tone added by the head end unit 25 to a predetermined bin output that is transmitted to the remote service units 30. The pilot tone is extracted from the received signal by the receiver of the remote service unit 30 and used, for example, as a reference signal for a phase-locked-loop circuit 600. The output of the phase-locked-loop 600 is provided to the input of a voltage controlled oscillator 605 which generates the reference clock for the remote service unit 30.

After the clock synchronization of step 720 is completed, the remote service unit 30 acquires its symbol timing at step 730. One way in which symbol timing may be acquired is illustrated in FIG. 17 which shows an impulse signal 800 being added by the head end unit 25 to the cyclic prefix CP of each symbol transmission. Preferably, the impulse signal 800 reverses polarity with each successive symbol transmission so that a positive polarity impulse signal is added to the cyclic prefix of one symbol transmission while a negative polarity impulse signal is added to the cyclic prefix of the subsequent symbol transmission.

The receiver 110 of the remote service unit 30 finds the time location of the transmitted impulse signal by sampling, at a predetermined rate, the symbols that it receives and alternately adding and subtracting the samples of individual sample periods over several symbol periods. For example, the receiver 110 may sample the received signal at a rate of 100 samples per symbol period to generate samples SA0...SA99 during a first symbol period, SB0...SB99 samples that it receives during a subsequent symbol period, SC0...SC99 samples that it receives during a subsequent third symbol period, and so on. A first sum Y0 is generated from the first sample period of each sampled symbol period in accordance with Y0=SA0−SB0+SC0.... Similar sums are generated for each of the sample periods through Y99 and the resulting sums are analyzed to determined where the peak amplitude occurs in the sampled symbol period. The time position of the peak amplitude corresponds to the time position of the added impulse signal and, thus, the time position of the cyclic prefix occurring at the beginning of each transmitted symbol. The receiver 110 can then make the requisite adjustments to ensure that it receives the symbols in proper alignment. When a narrowband receiver, such as the one described herein, is used, the received samples are preferably multiplied by cos $\theta_n$, where $\theta_n$ is $n*\theta_3$, (see phase compensation discussion above) and n is the symbol number.

Once the receiver 110 has acquired downstream symbol alignment, the system proceeds to step 740 where it acquires the downstream communications channel. The downstream communications channel comprises one or more bins used by the head end unit to establish initial communications with receivers 110.

After the receiver 110 has acquired the downstream communications channel, setup of the remote service unit communications proceeds to step 750. At step 750, the newly added or newly powered-up remote service unit 30 must inform the head end unit 25 that it is in need of registration whereby, among other things, the head end unit 25 allocates bins to the receiver and transmitter of the remote service unit 30. Ore problem associated with any initial transmission from the remote service unit 30 to the head end unit 25 is that the transmit boundary of the newly added remote service unit is not aligned with the transmit boundary of the other remote service units on the system. Thus, any misaligned transmission from the newly added remote service unit may corrupt the transmissions received from other remote service units.

One way of overcoming the problem of initial misalignment is illustrated in FIG. 18. To overcome the problem, a predetermined upstream bin is allocated as an upstream multi-access channel. The transmitter of the newly added remote service unit transmits information on the upstream multi-access channel in the illustrated manner by altering both its transmit phase and transmit power. As shown, the newly added remote service unit first maintains its transmit phase at a predetermined phase while gradually increasing the transmit power. The head end unit 25 can receive such a signal without a corresponding corruption of the data transmitted from the other remote service units. Once the head end unit 25 detects the transmission from the newly added remote service unit, it can perform any requisite processing of the received signal, such as equalization thereof. After a predetermined period of time has elapsed, the newly added remote service unit begins to slowly vary the phase of its transmitted signal in the illustrated manner. The transmit phase is varied so as to convey intelligent data to the head end unit 25. Accordingly, the head end unit 25 samples the phase of the signal that it receives on the upstream multi-access channel and uses the data, for example, to identify the newly added remote service unit.

After the newly added remote service unit has been identified by the head end unit 25, the head end unit 25 commands the newly added remote service unit, via the downstream communications channel, to send, for example, an impulse signal of a predetermined amplitude on the upstream communications channel at the symbol rate. Using the same basic method described above in connection with the remote service unit, the head end unit 25 detects the time position of the impulse signal and provides the remote service unit with the information necessary to align its symbol transmissions with the symbol transmissions of the other remote service units. Further communications between the newly added remote service unit and the head end unit 25 can take place on the upstream and downstream communications channels until the head end unit 25 allocates the transmit and receive bins that are to be assigned to the newly added remote service unit and instructs it accordingly. Once the foregoing has been completed, the head end unit 25 and the newly added remote service unit carry out their standard communications at step 760.

Of further note, although not of particular importance to the improved receiver architecture, is the fact that the present system can be designed to transmit and receive either 4 point constellations or 16 point constellations in a given bin depending on the signal-to-noise ratio in the communications system at the bin frequency. This determination is made by the head end unit 25 and the remote service unit(s) transmitting and/or receiving in that bin are instructed accordingly. In bins having a low signal-to-noise ratio, it is preferable to use 4 point constellations. In bins having a high signal-to-noise ratio, it is preferable to use 16 point constellations.

With the foregoing in mind, it can be seen why the embodiments of the remote service units described herein send and receive data in nine bins, respectively. In high noise conditions, four bins are needed by each of the two phones at the customer site to transmit data and four bins are needed by each of the two phones at the customer site to receive data. A total of eight bins are thus required in high noise conditions for each telephone receiver and transmitter, respectively. The further ninth bin may, for example, be used to facilitate a bin swapping function.

Although the present invention has been described with reference to specific embodiments, those of skill in the art will recognize that changes may be made thereto without departing from the scope and spirit of the invention as set forth in the appended claims.

The invention claimed is:

1. A method for filtering a digital signal spanning a plurality of symbol periods, the method comprising:
   filtering the digital signal at beginning and end portions of symbol periods to generate a filtered output;
   bypassing filtering of the digital signal at a middle portion of symbol periods to generate a bypassed output; and
   providing a filter output as a combination of the filtered output and the bypassed output.

2. The method of claim 1 further including storing the filter output for subsequent conversion to an analog signal.

3. The method of claim 1 further including filtering the beginning and the end portions symmetrically.

4. The method of claim 3 further including filtering the beginning and the end portions symmetrically as a function of adding a sample at the beginning portion of the signal to a corresponding symmetric sample at the end portion of the signal.

5. The method of claim 3 further including filtering the beginning and the end portions symmetrically as a function of multiplying a coefficient by a sample at the beginning portion of the signal and multiplying the coefficient by a corresponding symmetric sample at the end portion of the signal.

6. An apparatus for filtering a digital signal spanning a plurality of symbol period, the apparatus comprising:
   a filtering module to filter the digital signal at beginning and end portions of a symbol period to generate a filtered output;
   a bypass module to bypass the digital signal at a middle portion of the symbol period to generate a bypassed output; and
   an output module to provide a filter output as a combination of the filtered output and the bypassed output.

7. The apparatus of claim 6 further including a buffer configured to store the filter output for subsequent conversion to an analog signal.

8. The apparatus of claim 6 wherein the filter is a FIR filter.

9. The apparatus of claim 1 wherein the filter is symmetric.

10. The apparatus of claim 9 wherein the filter includes symmetric taps.

11. The apparatus of claim 6 further including an adder arranged to add a sample at the beginning portion of the signal to a corresponding symmetric sample at the end portion of the signal.

12. The apparatus of claim 6 further including a multiplier arranged to multiply a coefficient by a sample at the beginning portion of the signal and multiply the coefficient by a corresponding symmetric sample at the end portion of the signal.

13. A non-transitory computer readable medium including sequences of instructions that, when executed by a processor, causes the processor to perform a method for filtering a digital signal spanning a plurality of symbol periods, the sequence of instructions executed by the processor causing the processor to:
   filter the digital signal at beginning and end portions of a symbol period to generate a filtered output;
   bypass the digital signal at a middle portion of the symbol period to generate a bypassed output; and
   provide a filter output as a function of selecting between the filtered output and the bypassed output.

14. The non-transitory computer readable medium of claim 13 wherein the sequence of instructions further include instructions to cause the processor to store the filter output for subsequent conversion to an analog signal.

15. The non-transitory computer readable medium of claim 14 wherein the sequence of instructions further include instructions to cause the processor to filter the beginning and the end portions symmetrically.

16. The non-transitory computer readable medium of claim 15 wherein the sequence of instructions further include instructions to cause the processor to filter the beginning and the end portions symmetrically as a function of adding a sample at the beginning portion of the signal to a corresponding symmetric sample at the end portion of the signal.

17. The non-transitory computer readable medium of claim 15, wherein the sequence of instructions further include instructions to cause the processor to filter the beginning and the end portions symmetrically comprises: as a function of multiplying a coefficient by a sample at the beginning portion of the signal; and multiplying the coefficient by a corresponding symmetric sample at the end portion of the signal.

* * * * *

UNITED STATES PATENT AND TRADEMARK OFFICE
CERTIFICATE OF CORRECTION

| | |
|---|---|
| PATENT NO. | : 7,898,935 B2 |
| APPLICATION NO. | : 11/982449 |
| DATED | : March 1, 2011 |
| INVENTOR(S) | : Daniel J. Marchok, Richard C. Younce and Peter J. W. Melsa |

It is certified that error appears in the above-identified patent and that said Letters Patent is hereby corrected as shown below:

On the Title Page, in the "Related U.S. Application Data" Item (60), in the fourth line, delete "division" and insert -- divisional --.

In Column 18, Claim 17, Line 43, delete "comprises:".

Signed and Sealed this
Twenty-sixth Day of April, 2011

David J. Kappos
*Director of the United States Patent and Trademark Office*